(12) United States Patent
Byfield

(10) Patent No.: US 10,060,670 B2
(45) Date of Patent: Aug. 28, 2018

(54) AIR-COOLED MODULAR LNG PRODUCTION FACILITY

(71) Applicant: Woodside Energy Technologies Pty Ltd., Perth (AU)

(72) Inventor: Geoffrey Brian Byfield, Nedlands (AU)

(73) Assignee: WOODSIDE ENERGY TECHNOLOGIES PTY LTD., Perth (AU)

( * ) Notice: Subject to any disclaimer, the term of this patent is extended or adjusted under 35 U.S.C. 154(b) by 198 days.

(21) Appl. No.: 14/863,833

(22) Filed: Sep. 24, 2015

(65) Prior Publication Data

US 2016/0010916 A1 Jan. 14, 2016

Related U.S. Application Data

(63) Continuation of application No. PCT/AU2014/000328, filed on Mar. 27, 2014.

(30) Foreign Application Priority Data

Mar. 27, 2013 (AU) .................................. 2013901044

(51) Int. Cl.
*F25J 1/00* (2006.01)
*F25J 1/02* (2006.01)
(Continued)

(52) U.S. Cl.
CPC ............. *F25J 1/0022* (2013.01); *B63B 35/44* (2013.01); *F25J 1/0212* (2013.01); *F25J 1/0214* (2013.01);
(Continued)

(58) Field of Classification Search
CPC ........ F25J 1/0022; F25J 1/0055; F25J 1/0212; F25J 1/0214; F25J 1/0215; F25J 1/0216;
(Continued)

(56) References Cited

U.S. PATENT DOCUMENTS 3,161,492 A * 12/1964 Farkas ...................... F25D 3/00
405/203
8,931,217 B2 * 1/2015 Haney ...................... E04H 5/02
52/143

FOREIGN PATENT DOCUMENTS

AU 2012216352 A1 3/2014
JP 2011235675 A 11/2011
(Continued)

OTHER PUBLICATIONS

"Energy Efficient LNG Production", Wiguna et al., First presented in Gastech London 2012; BP Indonesia; http://bakti-bachtiar.blogspot.com/2014/12/energy-efficient-lng-production-abang.html; Further presented in LNG Journal Jan. 2013.*
(Continued)

*Primary Examiner* — Keith Raymond
(74) *Attorney, Agent, or Firm* — Edell, Shapiro & Finnan, LLC

(57) ABSTRACT

A liquefied natural gas production plant for producing a product stream of liquefied natural gas installed at a production location and a process for producing liquefied natural gas includes a plurality of modules and an air-cooled heat exchanger bank designed for the installed production train. The heat exchanger bank includes a first row of air-cooled heat exchanger bays, and an adjacent parallel second row of air-cooled heat exchanger bays.

59 Claims, 14 Drawing Sheets

(51) Int. Cl.
*B63B 35/44* (2006.01)
*F28F 9/26* (2006.01)
*F28B 1/06* (2006.01)

(52) U.S. Cl.
CPC .......... *F25J 1/0215* (2013.01); *F25J 1/0216* (2013.01); *F25J 1/0259* (2013.01); *F25J 1/0275* (2013.01); *F25J 1/0277* (2013.01); *F25J 1/0278* (2013.01); *F25J 1/0296* (2013.01); *F28B 1/06* (2013.01); *F28F 9/26* (2013.01); *B63B 2035/448* (2013.01); *Y02P 80/156* (2015.11)

(58) Field of Classification Search
CPC ........ F25J 1/0296; F25J 1/0259; F25J 1/0258; F25J 1/0269; F25J 1/027; F25J 1/0271; F25J 1/0272; F25J 1/0275; F25J 1/0277; F25J 1/0278
See application file for complete search history.

(56) References Cited

FOREIGN PATENT DOCUMENTS

| | | |
|---|---|---|
| KR | 20130009064 A | 1/2013 |
| WO | 2010059059 A1 | 5/2010 |
| WO | 2012072292 A1 | 6/2012 |

OTHER PUBLICATIONS

Forced ventilation effect by Air-Fin-Cooler in modularized onshore LNG plnat, Tanabe et al., Process Safety and Environmental Protection 91 (2013), Received Sep. 23, 2011, accepted Sep. 4, 2012. Copyright 2012 The instituion of Chemical Engineers.*
International Search Report in counterpart International Application No. PCT/AU2014/000328 (4 pages), dated Jun. 3, 2014.

* cited by examiner

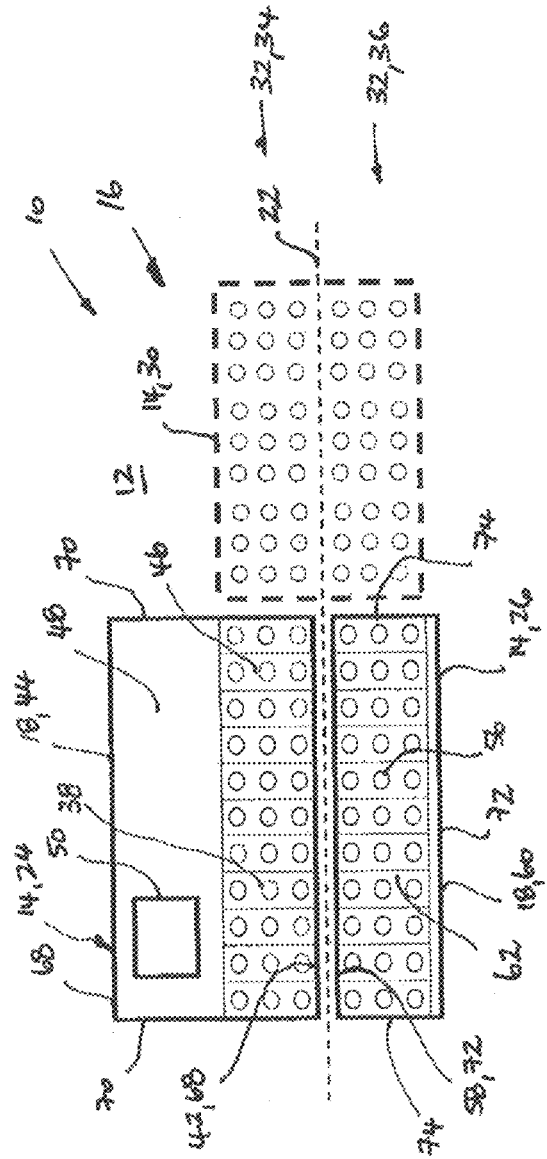
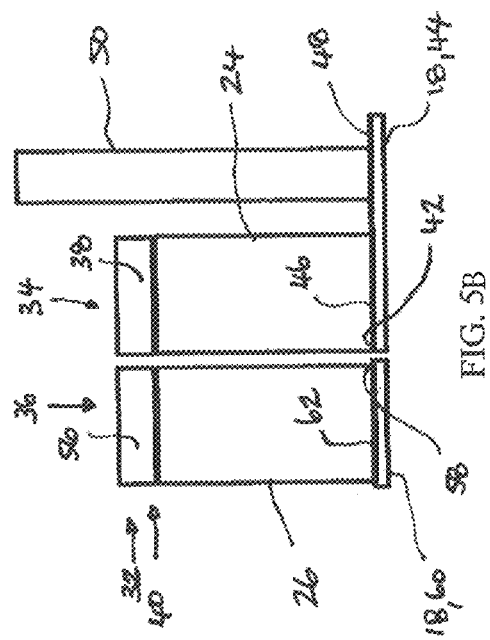
FIG. 5A
FIG. 5B

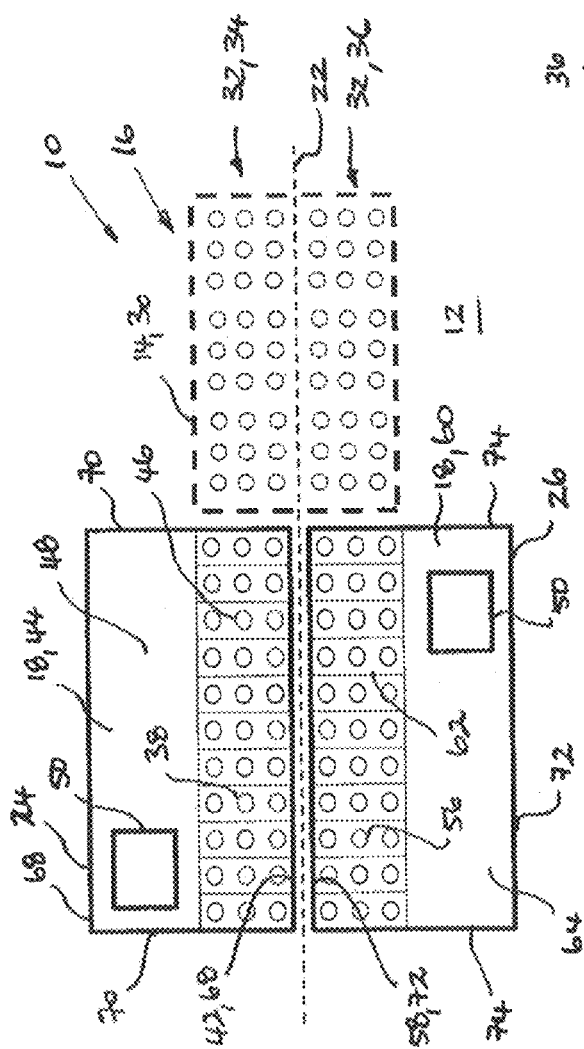
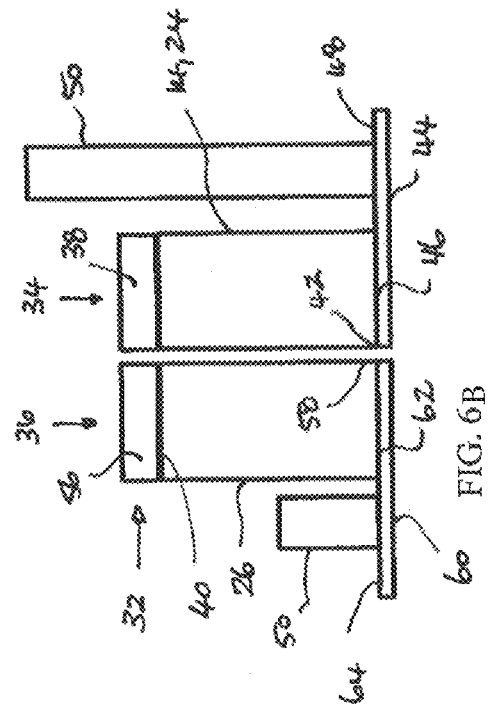
FIG. 6A
FIG. 6B

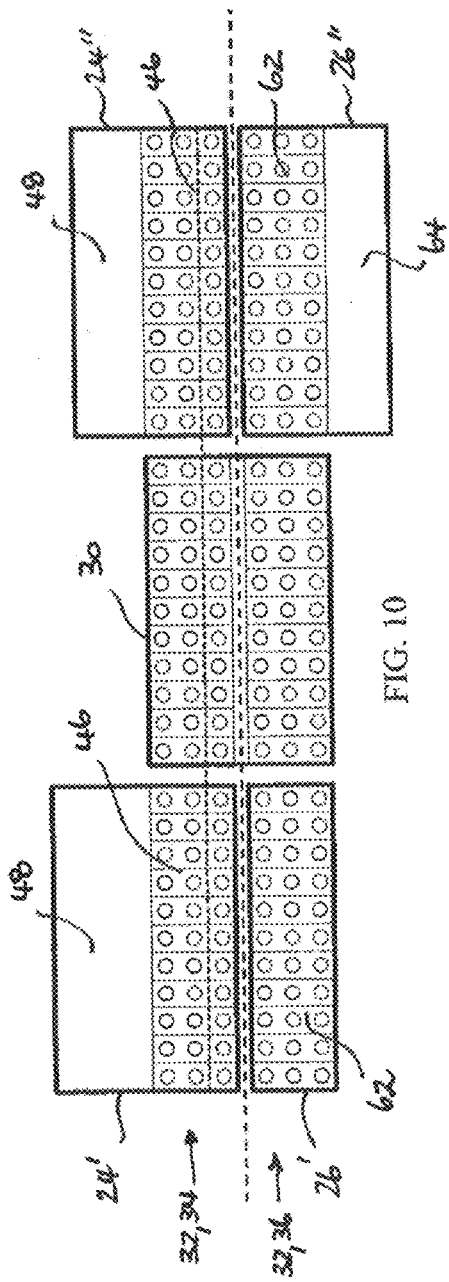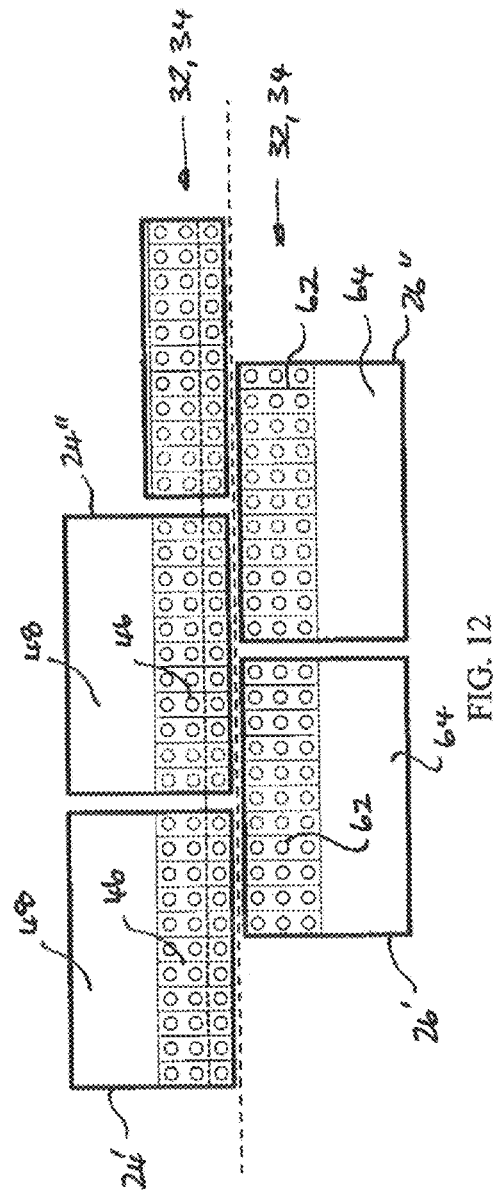

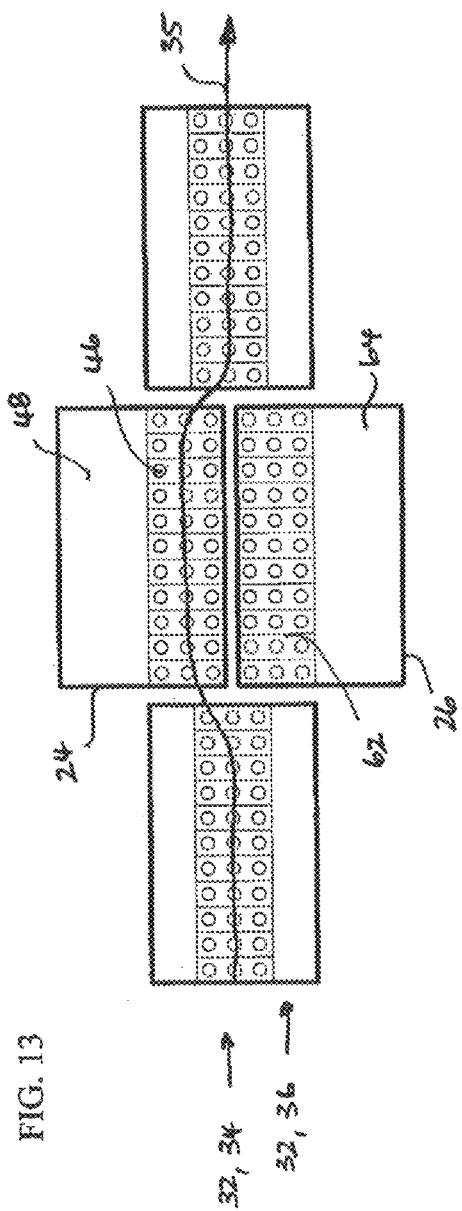
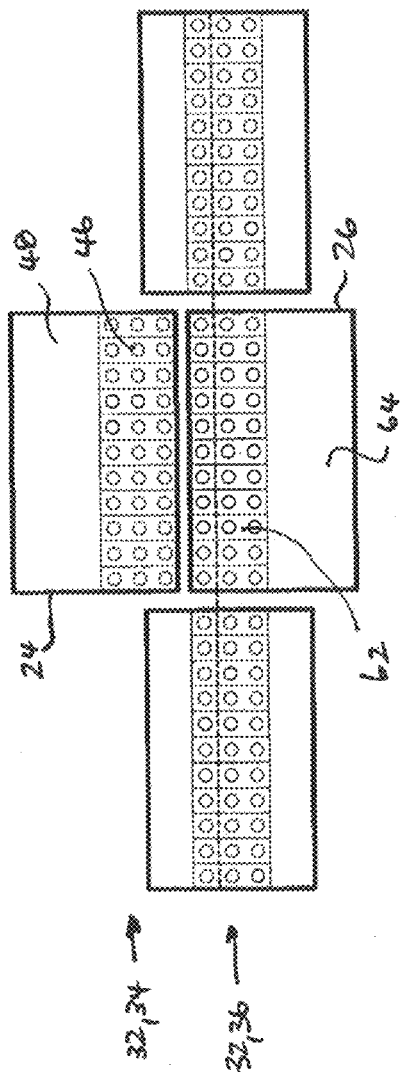

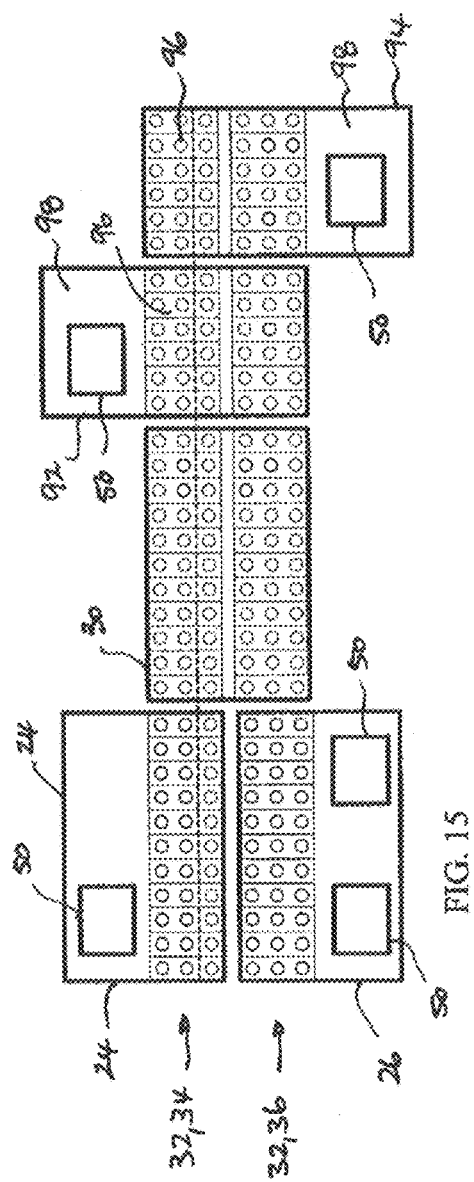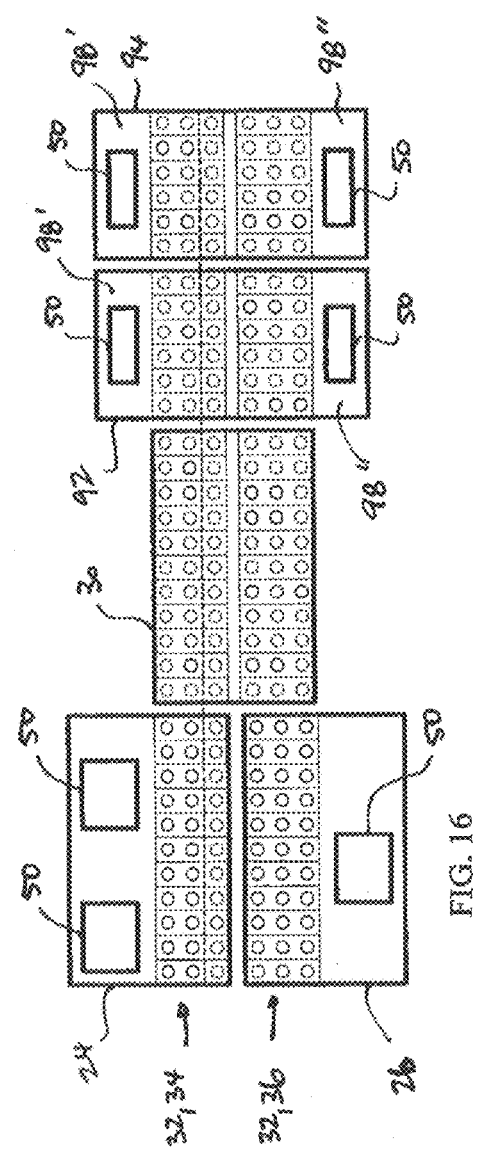

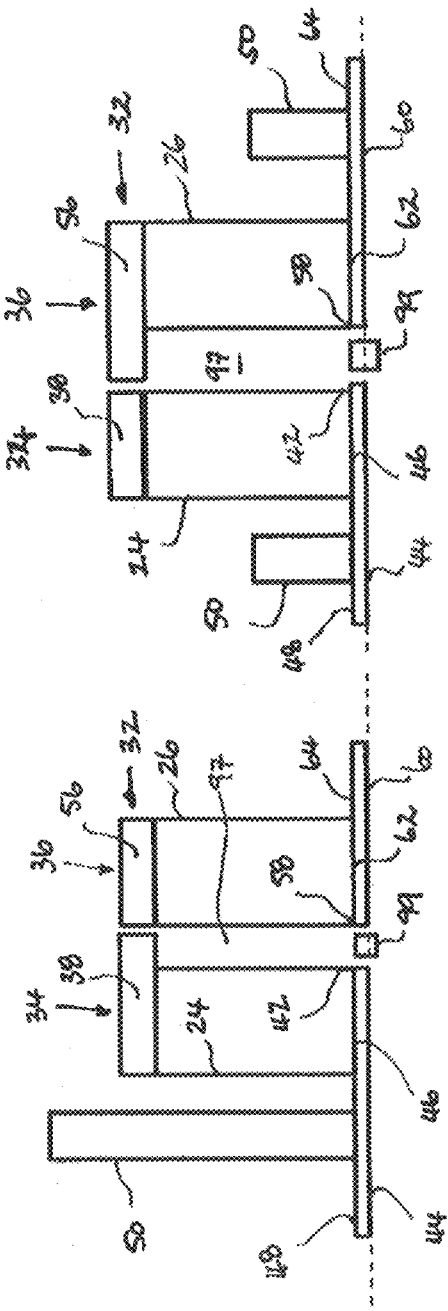

AIR-COOLED MODULAR LNG PRODUCTION FACILITY

FIELD

The present invention relates to an air-cooled liquefied natural gas production process for producing a product stream of liquefied natural gas at a production location using a plurality of modules. The present invention further relates to an air-cooled liquefied natural gas production plant for producing a product stream of liquefied natural gas at a production location using a plurality of modules.

BACKGROUND

Natural gas ("NG") is routinely transported from one location to another location in its liquid state as "Liquefied Natural Gas" (LNG). Liquefaction of the natural gas makes it more economical to transport as LNG occupies only about $1/600^{th}$ of the volume that the same amount of natural gas does in its gaseous state. After liquefaction, LNG is typically stored in cryogenic containers either at or slightly above atmospheric pressure. LNG is regasified before distribution to end users through a pipeline or other distribution network at a temperature and pressure that meets the delivery requirements of the end users.

Wellhead gas is subjected to gas pre-treatment to remove contaminants prior to liquefaction. The hydrogen sulphide and carbon dioxide can be removed using a suitable process such as amine adsorption. Removal of water can be achieved using conventional methods, for example, a molecular sieve. Depending on the composition of contaminants present in the inlet gas stream, the inlet gas stream may be subjected to further pre-treatment to remove other contaminants, such as mercury and heavy hydrocarbons prior to liquefaction. Liquefaction is achieved using methods that are well established in the art which typically involve compression and cooling. Such processes include the APCI C3/MR™ or SplitMR™ or AP-X™, processes, the ConocoPhillips Optimized Cascade Process, the Linde Mixed Fluid Cascade process or the Shell Double Mixed Refrigerant or Parallel Mixed Refrigerant process. Regardless of the choice of liquefaction process, refrigerants are used to reduce the temperature of the treated wellhead gas to a temperature of around −160° C. to form LNG, resulting in warming of the refrigerant which must be compressed for recycle to the liquefaction process. The compressors used for this duty are traditionally steam turbines, gas turbines or electric motors depending on the power requirements and layout issues of a particular LNG production facility. The coolers required for the various compression and heat exchanger operations associated with an LNG plant may be air coolers or water coolers arranged in a heat exchanger bank.

Prior art modularised LNG production trains have been closely based upon the design and layout of the more traditional stick-built LNG production trains. Until now, modularisation has been conducted by slicing up an existing stick built LNG train design into transportable sections, leading to some compromises regarding the placement of the module boundaries. Prior art examples of modularization of a traditional stick-built air-cooled LNG train have relied on dividing the centrally located air-cooled heat exchanger bank into the smallest number of modules possible for a given size of air cooler within the air-cooled heat exchanger bank. The result is that the other process equipment is located in separate stand-alone modules as illustrated schematically in FIG. 1(a). The disadvantage of this approach is a large number of piping connections between the air-cooled heat exchangers and the other associated processing equipment.

There remains a need to explore alternative designs for a modular LNG production plant to alleviate this problem.

SUMMARY

According to a first aspect of the present invention there is provided a liquefied natural gas production process for producing a product stream of liquefied natural gas at a production location, said process comprising:
  a) designing a plurality of modules for installation at the production location to form an installed production train, each module having a module base for mounting a plurality of plant equipment associated with a selected function associated with the production of liquefied natural gas, said selected function being assigned to said module, the plurality of modules including a first module assigned to perform a first selected function, and, a second module assigned to perform a second selected function;
  b) designing an air-cooled heat exchanger bank for the installed production train, the heat exchanger bank including: a first row of air-cooled heat exchanger bays, and, an adjacent parallel second row of air-cooled heat exchanger bays;
  c) arranging a first sub-section of the first row of heat exchanger bays at an elevated level vertically offset from and towards a first edge of a first module base to form a covered section of the first module base, the first module base being designed and sized to include an uncovered section for mounting a selected piece of process equipment, wherein the first module includes the first sub-section of the first row of heat exchanger bays without including a sub-section of the second row of heat exchanger bays;
  d) arranging a first sub-section of the second row of heat exchanger bays at an elevated level vertically offset from and towards a first edge of a second module base to provide a covered section of the second module base, wherein the second module includes the first sub-section of the second row of heat exchanger bays without including a sub-section of the first row of heat exchanger bays; and,
  e) positioning the first edge of the second module base at the production location towards the first edge of the first module base.

In one form, the selected piece of equipment is; a rotating piece of equipment associated with a circulating refrigerant, a piece of equipment having a flammable inventory, a long lead-time piece of equipment, or, a piece of equipment having an overall height that is taller than the height of the elevated level.

In one form, the process further comprises the step of sizing the second module base to include an uncovered section for mounting a selected piece of process equipment. In one form, the selected piece of equipment is; a rotating piece of equipment associated with a circulating refrigerant, a piece of equipment having a flammable inventory, a long lead-time piece of equipment, or, a piece of equipment having an overall height that is taller than the height of the elevated level.

In one form, the first module base has a rectangular footprint comprising two long sides and two short sides and the first edge of the first module base is arranged along one of the two long sides. In one form, the second module base has a rectangular footprint comprising two long sides and two short sides and the first edge of the second module base is arranged along one of the two long sides. In one form, the first module base has a rectangular footprint comprising two long sides and two short sides and the first edge of the first module base is arranged along one of the two short sides. In one form, the second module base has a rectangular footprint comprising two long sides and two short sides and the first edge of the second module base is arranged along one of the two short sides. In one form, a second sub-section of the first or second row of heat exchanger bays is positioned on an adjacent module.

In one form, the first module is one of a plurality of first modules. In one form, the second module is one of a plurality of second modules.

In one form, the process further comprises the step of constructing at least one of the plurality of modules at a construction location or assembling at least one of the plurality of modules at an assembly location prior to transport to the production location, and testing the at least one module for verification purposes at the construction or assembly location.

In one form, the installed production train has a longitudinal axis extending from a first end of the installed production train to a second end of the installed production train and the first row of heat exchanger bays is arranged in a straight line parallel or perpendicular to the longitudinal axis of the installed production train. In one form, the installed production train has a longitudinal axis extending from a first end of the installed production train to a second end of the installed production train and the second row of heat exchanger bays is arranged in a straight line parallel or perpendicular to the longitudinal axis of the installed production train.

In one form, the first sub-section of the first row of heat exchanger bays is the first row of heat exchanger bays. In one form, the first sub-section of the second row of heat exchanger bays is the second row of heat exchanger bays. In one form, the first sub-section of the first row of heat exchanger bays is arranged to extend outwardly beyond the first edge of the first module base, and a gap is formed between the first module base and the second module base during step (d). In one form, the first sub-section of the second row of heat exchanger bays is arranged to extend outwardly beyond the first edge of the second module base, and a gap is formed between the first module base and the second module base during step (d).

In one form, the first sub-section of the first row of heat exchanger bays and the first sub-section of the second row of heat exchanger bays is arranged to extend outwardly beyond the first edge of the second module base, and a gap is formed between the first module base and the second module base during step (d).

In one form, the process further comprises the steps of arranging a plurality of third module heat exchangers operatively associated with a third selected function on a third module base to form a portion of the first row of heat exchanger bays and a portion of the second row of heat exchanger bays, the plurality of third module heat exchangers being arranged on an elevated level vertically offset from the third module base to provide a covered section of the third module base. In one form, the process further comprises the step of sizing the third module base such that the plurality of third module heat exchangers covers at least 90% of the third module base to form a fully covered third module. In one form, the third module is one of a plurality of third modules.

In one form, one of the plurality of modules is a pre-treatment module for removing contaminants from a natural gas feed stream to produce a pre-treated natural gas stream. In one form, one of the plurality of modules is a first refrigerant condenser module for pre-cooling a pre-treated natural gas stream to produce a pre-cooled gas stream and a first refrigerant vapour stream. In one form, one of the plurality of modules is a first refrigerant compression module for compressing a first refrigerant vapour stream to produce a compressed first refrigerant stream for recycle to a first refrigerant condenser module. In one form, one of the plurality of modules is a liquefaction module operatively associated with a main cryogenic heat exchanger for further cooling a pre-cooled gas stream through indirect heat exchange with a second refrigerant to produce a liquefied natural gas product stream and a second refrigerant vapour stream. In one form, one of the plurality of modules is a second refrigerant compression module for compressing a second refrigerant vapour stream to produce a compressed second refrigerant stream for recycle to a main cryogenic heat exchanger. In one form, the first refrigerant is propane or nitrogen. In one form, the second refrigerant is a mixed refrigerant hydrocarbon mixture or nitrogen. In one form, the production location is onshore, offshore on a floating facility, offshore on a fixed facility, barge-mounted or grounded facility.

According to a second aspect of the present invention there is provided a liquefied natural gas production plant for producing a product stream of liquefied natural gas installed at a production location comprising:

a plurality of modules designed for installation at the production location to form an installed production train, each module having a module base for mounting a plurality of plant equipment associated with a selected function associated with the production of liquefied natural gas, said selected function being assigned to said module, the plurality of modules including a first module assigned to perform a first selected function, and, a second module assigned to perform a second selected function;

an air-cooled heat exchanger bank designed for the installed production train, the heat exchanger bank including: a first row of air-cooled heat exchanger bays, and, an adjacent parallel second row of air-cooled heat exchanger bays;

a first sub-section of the first row of heat exchanger bays arranged at an elevated level vertically offset from and towards a first edge of a first module base to form a covered section of the first module base, the first module base being designed and sized to include an uncovered section for mounting a selected piece of process equipment, wherein the first module includes the first sub-section of the first row of heat exchanger bays without including a sub-section of the second row of heat exchanger bays;

a first sub-section of the second row of heat exchanger bays arranged at an elevated level vertically offset from and towards a first edge of a second module base to provide a covered section of the second module base, wherein the second module includes the first sub-section of the second row of heat exchanger bays without including a sub-section of the first row of heat exchanger bays; and, the first edge of the second module base positioned at the production location towards the first edge of the first module base.

In one form, the selected piece of equipment is; a rotating piece of equipment associated with a circulating refrigerant, a piece of equipment having a flammable inventory, a long lead-time piece of equipment, or, a piece of equipment having an overall height that is taller than the height of the elevated level.

In one form, the second module base is sized to include an uncovered section for mounting a selected piece of process equipment. In one form, the selected piece of equipment is; a rotating piece of equipment associated with a circulating refrigerant, a piece of equipment having a flammable inventory, a long lead-time piece of equipment, or, a piece of equipment having an overall height that is taller than the height of the elevated level.

In one form, the first module base has a rectangular footprint comprising two long sides and two short sides and the first edge of the first module base is arranged along one of the two long sides. In one form, the second module base has a rectangular footprint comprising two long sides and two short sides and the first edge of the second module base is arranged along one of the two long sides. In one form, the first module base has a rectangular footprint comprising two long sides and two short sides and the first edge of the first module base is arranged along one of the two short sides. In one form, the second module base has a rectangular footprint comprising two long sides and two short sides and the first edge of the second module base is arranged along one of the two short sides.

In one form, a second sub-section of the first or second row of heat exchanger bays is positioned on an adjacent module.

In one form, the first module is one of a plurality of first modules. In one form, the second module is one of a plurality of second modules.

In one form, the installed production train has a longitudinal axis extending from a first end of the installed production train to a second end of the installed production train and the first row of heat exchanger bays is arranged in a straight line parallel or perpendicular to the longitudinal axis of the installed production train.

In one form, the installed production train has a longitudinal axis extending from a first end of the installed production train to a second end of the installed production train and the second row of heat exchanger bays is arranged in a straight line parallel or perpendicular to the longitudinal axis of the installed production train.

In one form, the first sub-section of the first row of heat exchanger bays is the first row of heat exchanger bays. In one form, the first sub-section of the second row of heat exchanger bays is the second row of heat exchanger bays.

In one form, the first sub-section of the first row of heat exchanger bays is arranged to extend outwardly beyond the first edge of the first module base, and a gap is formed between the first module base and the second module. In one form, the first sub-section of the second row of heat exchanger bays is arranged to extend outwardly beyond the first edge of the second module base, and a gap is formed between the first module base and the second module base. In one form, the first sub-section of the first row of heat exchanger bays and the first sub-section of the second row of heat exchanger bays is arranged to extend outwardly beyond the first edge of the second module base, and a gap is formed between the first module base and the second module base during step (d).

In one form, the production plant further comprises a plurality of third module heat exchangers operatively associated with a third selected function arranged on a third module base to form a portion of the first row of heat exchanger bays and a portion of the second row of heat exchanger bays, the plurality of third module heat exchangers being arranged on an elevated level vertically offset from the third module base to provide a covered section of the third module base. In one form, the third module base is sized such that the plurality of third module heat exchangers covers at least 90% of the third module base to form a fully covered third module. In one form, the third module is one of a plurality of third modules.

In one form, one of the plurality of modules is a pre-treatment module for removing contaminants from a natural gas feed stream to produce a pre-treated natural gas stream. In one form, one of the plurality of modules is a first refrigerant condenser module for pre-cooling a pre-treated natural gas stream to produce a pre-cooled gas stream and a first refrigerant vapour stream. In one form, one of the plurality of modules is a first refrigerant compression module for compressing a first refrigerant vapour stream to produce a compressed first refrigerant stream for recycle to a first refrigerant condenser module. In one form, one of the plurality of modules is a liquefaction module operatively associated with a main cryogenic heat exchanger for further cooling a pre-cooled gas stream through indirect heat exchange with a second refrigerant to produce a liquefied natural gas product stream and a second refrigerant vapour stream. In one form, one of the plurality of modules is a second refrigerant compression module for compressing a second refrigerant vapour stream to produce a compressed second refrigerant stream for recycle to a main cryogenic heat exchanger.

In one form, the first refrigerant is propane or nitrogen. In one form, the second refrigerant is a mixed refrigerant hydrocarbon mixture or nitrogen.

In one form, the production location is onshore, offshore on a floating facility, offshore on a fixed facility, barge-mounted or grounded facility.

BRIEF DESCRIPTION OF THE DRAWINGS

In order to facilitate a more detailed understanding of the nature of the invention several embodiments of the present invention will now be described in detail, by way of example only, with reference to the accompanying drawings, in which:

FIG. 5(a) is a schematic plan view of one embodiment of the present invention showing a first module with a covered and uncovered section and a second fully covered module;

FIG. 5(b) is a schematic side view of the embodiment of FIG. 5(a);

FIG. 6(a) is a schematic plan view of one embodiment of the present invention showing a first module with a covered and uncovered section and a second module with a covered and uncovered section;

FIG. 6(b) is a schematic side view of the embodiment of FIG. 6(a);

FIG. 7 is a schematic plan view of one embodiment of the present invention showing a first module with a covered and uncovered section and a second fully covered module;

FIG. 8 is a schematic plan view of one embodiment of the present invention showing a first module with a covered and uncovered section and a second module with a covered and uncovered section;

FIG. 10 is a schematic plan view of one embodiment of the present invention showing two first modules, each with a covered and uncovered section, one second module with a covered and uncovered section, one fully covered second module, and a third module;

FIG. 12 is a schematic plan view of one embodiment of the present invention showing two first modules, each with a covered and uncovered section, two second modules, each with a covered and uncovered section, and, an additional module arranged towards one end of the installed production train;

FIG. 13 is a schematic plan view of one embodiment of the present invention showing one first module, including a first section of the first row of heat exchanger bays, one second module including a first section of the second row of heat exchanger bays which comprises the whole of the second row of heat exchangers bays, and two additional modules including heat exchanger bays which together with those in the first module comprise the first row of heat exchanger bays in a staggered manner;

FIG. 14 is a schematic plan view of one embodiment of the present invention showing one first module, including a first section of the first row of heat exchanger bays which comprises the whole of the first row of heat exchangers bays, one second module, including a first section of the second row of heat exchanger bays, and two additional modules including heat exchanger bays which together with those in the second module comprise the second row of heat exchanger bays, arranged in a linear manner;

FIG. 15 is a schematic plan view of one embodiment of the present invention showing one first module, one second module, one third module, one fourth module and one fifth module;

FIG. 16 is a schematic plan view of another embodiment of the present invention showing one first module, one second module, one third module, one fourth module and one fifth module;

FIG. 20 is a schematic side view of one embodiment of the present invention showing the first sub-section of the first row of heat exchanger bays extending outwardly beyond the first edge of the first module base to form a gap between the first module base and the second module base;

FIG. 21 is a schematic side view of one embodiment of the present invention showing the first sub-section of the second row of heat exchanger bays arranged to extend outwardly beyond the first edge of the second module base to form a gap between the first module base and the second module base; and, FIG. 22 is a schematic side view of one embodiment of the present invention showing both the first section of the first row of heat exchanger bays arranged to extend outwardly beyond the first edge of the first module base and the first section of the second row of heat exchanger bays arranged to extend outwardly beyond the first edge of the second module base to form a gap between the first module base and the second module base.

DETAILED DESCRIPTION

Figure 1A:
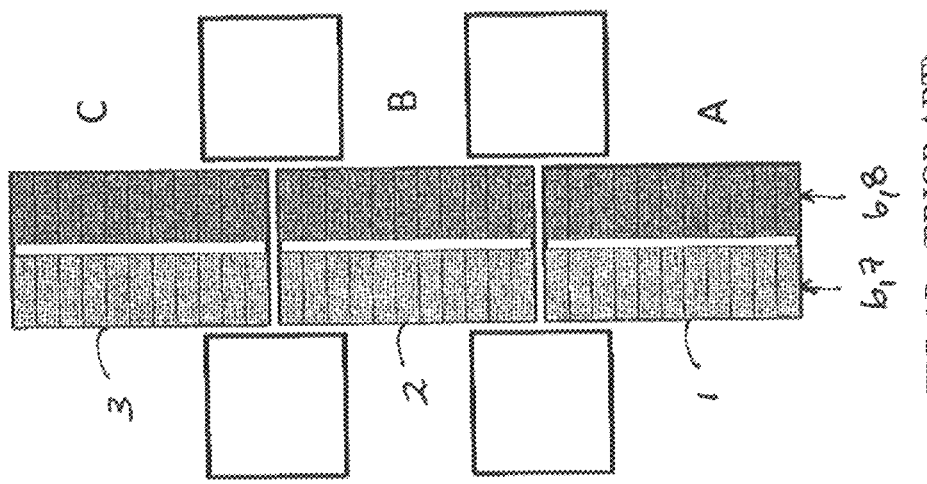
FIG. 1(a) is a schematic plan view of a prior art production train.

The present invention may be understood more readily by reference to the following detailed description of the invention taken in connection with the accompanying drawing figures, which form a part of this disclosure. It is to be understood that the present invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Unless defined otherwise, all technical and scientific terms used herein have the same meanings as commonly understood by one of ordinary skill in the art to which this invention belongs. Like reference numerals refer to like parts.

The term "LNG" refers to liquefied natural gas.

The term "production train" refers to facilities used for the pre-treatment of a natural gas feed stream to remove contaminants and facilities used for receiving pre-treated gas and subjecting the pre-treated gas to cooling to form liquefied natural gas.

The term "heat exchanger bay" refers to a heat exchanger having a plurality of tubes extending between flow headers with fluid being caused to flow through the plurality of tubes to exchange heat with a heat exchange medium that passes across the outside of the plurality of tubes. The term "air-cooled heat exchanger bay" refers to a heat exchanger bay having a single row of fans (usually 2-4) arranged within each heat exchanger bay between the headers to direct the flow of air across the plurality of tubes.

The term "heat exchanger bank" refers to a collection of air-cooled heat exchanger bays arranged adjacent to each other in a single or double row.

The term "stick-built" or "off-module" refers to a plant or a section of a plant that is constructed predominantly on a production location which the plant is intended to occupy upon completion of construction of the plant. In contrast, the term "module" refers to a section of a plant that is pre-assembled at a construction or assembly location remote from the production location. Each module is designed to be transported from the construction or assembly location to the production location by towing or on floating barges or by land using rail or truck. After each module is moved from the construction or assembly location to the production location, the module is positioned in a suitable pre-determined orientation to suit the needs of a given LNG production facility.

Figure 1B:
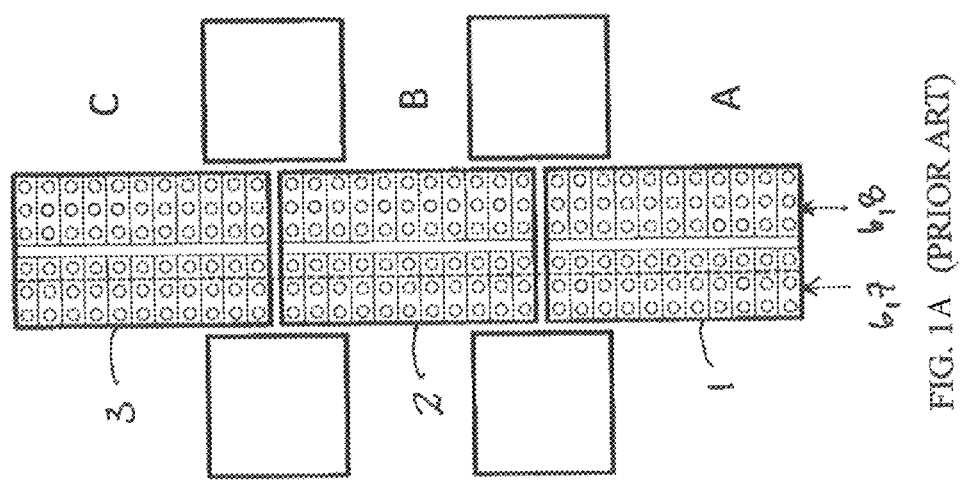
FIG. 1(b) is a schematic plan view of the prior art production train of FIG. 1(a) with light grey shading to illustrate the location of the first row of heat exchanger bays and dark grey shading to illustrate the location of the second row of heat exchanger bays.
Figure 2A:
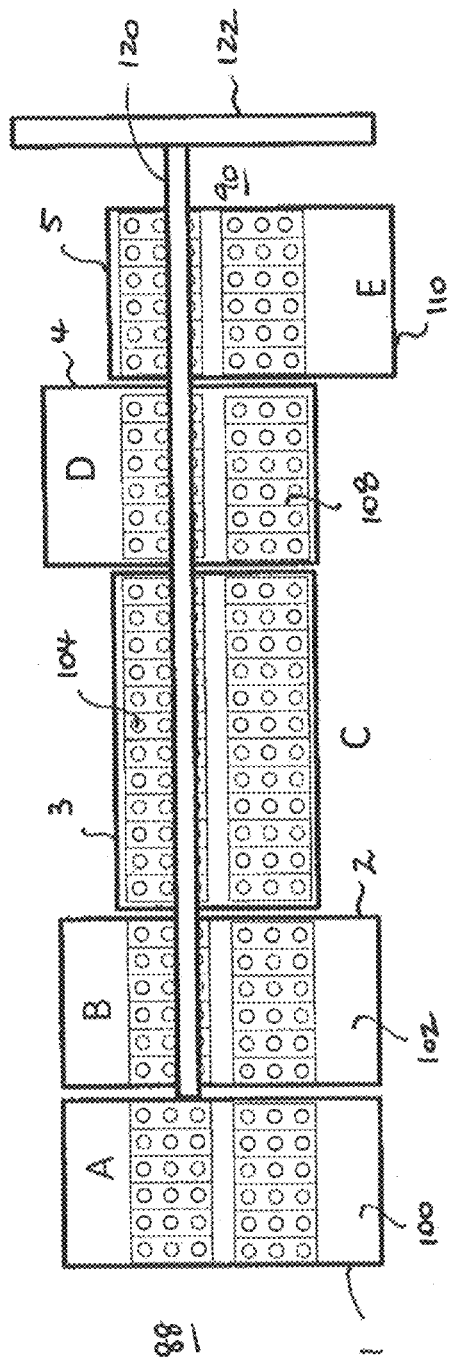
FIG. 2(a) is a schematic plan view of an alternative prior art production train.
Figure 2B:
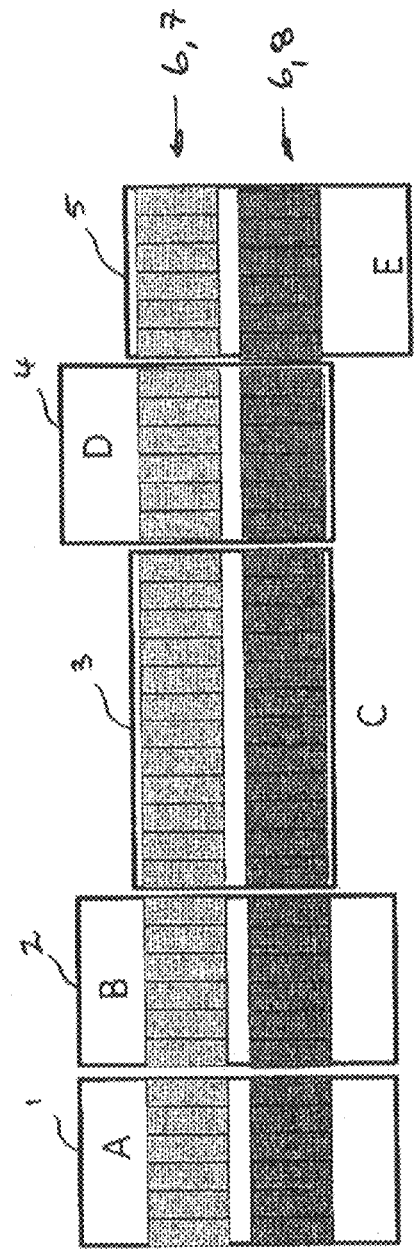
FIG. 2(b) is a schematic plan view of the prior art production train of FIG. 2(a) with light grey shading to illustrate the location of the first row of heat exchanger bays and dark grey shading to illustrate the location of the second row of heat exchanger bays.

Before describing various embodiments of the present invention, two examples of prior art modular LNG production facilities will be briefly described. The first example is illustrated schematically in FIG. 1(a) and FIG. 1(b). The second example is illustrated schematically in FIGS. 2(a) and 2(b) and is the subject of a co-owned and co-pending patent application. Referring to FIGS. 2(a) and 2(b), the facility includes Prior Art Module A (1), Prior Art Module B (2), Prior Art Module C (3), Prior Art Module D (4), and, Prior Art Module E (5). To keep the overall plot size of the LNG production facility to a minimum, it is known to arrange sub-sections of the air-cooled heat exchanger bank (6) over the top of selected modules so as to cover one hundred percent of the area defined by the base of said module with a view to making the air-cooled heat exchanger bank as large as possible for a given module size. Prior Art Module C (3) is completely covered, whilst the other four modules extend beyond the sides of the air-cooled heat exchanger bank (6) in order to provide uncovered space to accommodate other processing equipment. The air-cooled heat exchanger bank (6) is made up of a first row of heat exchanger bays (7) and a second row of heat exchanger bays (8). The first and second rows of heat exchanger bays extend parallel to each other along the full length of the production facility. For clarity purposes only, the first row of heat exchanger bays in FIG. 2(b) is shaded in light grey with the second row of heat exchanger bays shaded in dark grey. As is best seen from FIG. 2(b), each of Prior Art Module A (1), Prior Art Module B (2), Prior Art Module C (3), Prior Art Module D (4), and, Prior Art Module E (5) include a portion of the first row of heat exchanger bays (7) and a portion of the second row of heat exchanger bays (8). In the prior art arrangement illustrated in FIG. 1(a), the air-cooled heat exchanger bank (6) is analogously made up of a first row of heat exchanger bays (7) and a second row of heat exchanger bays (8). For clarity purposes only, the first row of heat exchanger bays in FIG. 1(b) is shaded in light grey with the second row of heat exchanger bays shaded in dark grey. As is best seen from FIG. 1(b), each of Prior Art Module A (1), Prior Art Module B (2), and, Prior Art Module C (3) include a portion of the first row of heat exchanger bays (7) and a portion of the second row of heat exchanger bays (8). The present invention has been developed in part to provide an alternative to these prior art air-cooled heat exchanger bank arrangements.

A first embodiment of the present invention is now described with reference to FIGS. 3 to 5 which schematically show a liquefied natural gas production process (10) for producing a product stream of liquefied natural gas at a production location (12). The process includes designing a plurality of modules (14) for installation at the production location (12) to form an installed production train (16) having a longitudinal axis (22). Each module (14) has a module base (18) for mounting a plurality of plant equipment (20) associated with a selected function associated with the production of liquefied natural gas, said selected function being assigned to said module (14). The plurality of modules (14) includes at least; a first module (24) assigned to perform a first selected function, a second module (26) assigned to perform a second selected function, and, optionally, a third module (30) assigned to perform a third selected function. The number of modules within the plurality of modules may vary. By way of example, in the embodiments illustrated in FIGS. 5-6, the production train (16) comprises three modules with the first module (24) and the second module (26) shown in solid lines and the third module (30) shown in dotted lines to indicate that this modules is optional or able to be added to the installed production train at a later date. In the embodiment illustrated in FIG. 7, the production train (16) comprises three modules. In the embodiment illustrated in FIG. 8, the production train (16) comprises four modules with two shown in solid lines and two shown in dotted lines to indicate that these modules are optional or able to be added to the production train at a later date. In the embodiment illustrated in FIG. 9, the production train (16) comprises five modules.

Figure 3B:
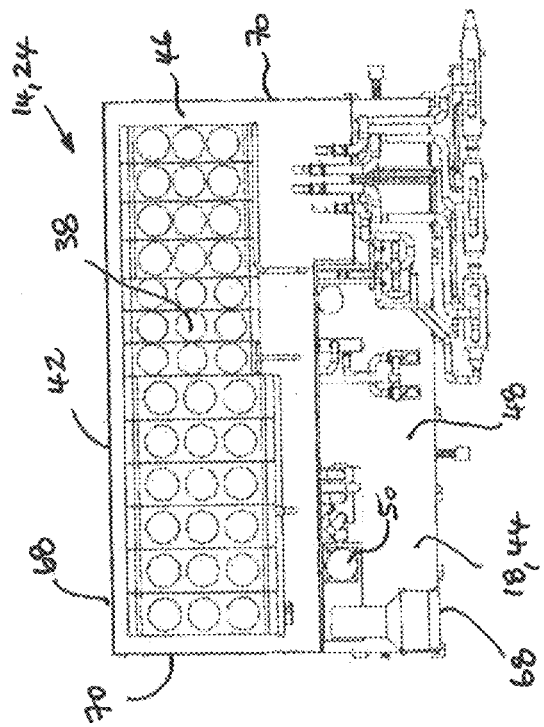
FIG. 3(b) is a plan view of the module of FIG. 3(a)
Figure 3A:
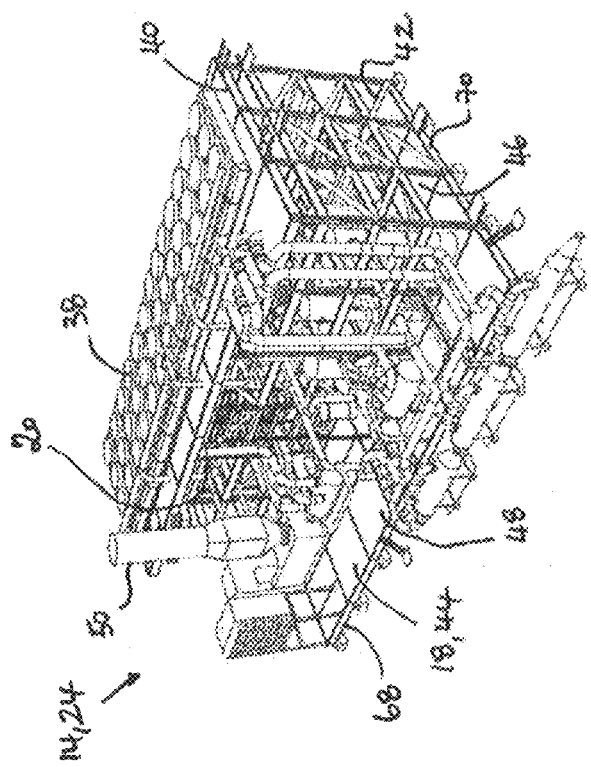
FIG. 3(a) is an isometric view from one direction of one of the plurality of modules of an LNG production train of the present invention showing a first module designed and sized to include a covered section and an uncovered section.

The process of the present invention includes the step of designing an air-cooled heat exchanger bank (32) including: a first row of heat exchanger bays (34) and, an adjacent parallel second row of heat exchanger bays (36). Referring to FIGS. 3(a) and 3(b), the process of the present invention includes the step of arranging a first sub-section (38) of the first row of heat exchanger bays (34) at an elevated level (40) vertically offset from and towards a first edge (42) of the first module base (44). This arrangement is used to provide a covered section (46) of the first module base (44). This arrangement is used to minimize the plot space required for the production train (16) and improve efficiency of air cooling by way of improved circulation. In addition to this, the first module base is designed and sized to include an uncovered section (48) for mounting a selected piece of process equipment (50). The selected piece of equipment (50) may be selected from the group including, but not limited to: a rotating piece of equipment associated with a circulating refrigerant, a piece of equipment having a flammable inventory, a long lead-time piece of equipment, or, a piece of equipment having an overall height that is taller than the height of the elevated level (40).

When the first module (24) is installed at the production location, the first edge (42) of the first module base (44) is positioned so that the first sub-section (38) forms part of the first row of heat exchanger bays (34) of the installed production train (16). Advantageously, the uncovered section (48) of the first module base (44) is further positioned away from the longitudinal axis of the installed production train (22) than the covered section (46) as best seen in FIG. 5. Using this arrangement, the uncovered section of the first module base allows unobstructed overhead crane access to the selected pieces of equipment as well as improved side access making construction or maintenance activities for the selected pieces of equipment easier to perform. Sizing the first module base to include an uncovered section in addition to the covered section, allows for installation and positioning of the selected pieces of equipment in a less congested area of the module which has the flow-on benefit of allowing the selected pieces of equipment to be the last pieces of equipment that are installed on the module. Sizing the first module base to include an uncovered section in addition to the covered section, also allows entire processing systems that include both air-cooled heat exchangers and other types of processing equipment that cannot be installed beneath the air-cooled heat exchanger bank to be installed within the same module. This allows all of the interconnecting pipes between those related equipment items to be completed as part of module fabrication, thus eliminating the need to complete the pipework at the production location which provide significant cost and time savings over the prior art.

Figure 4B:
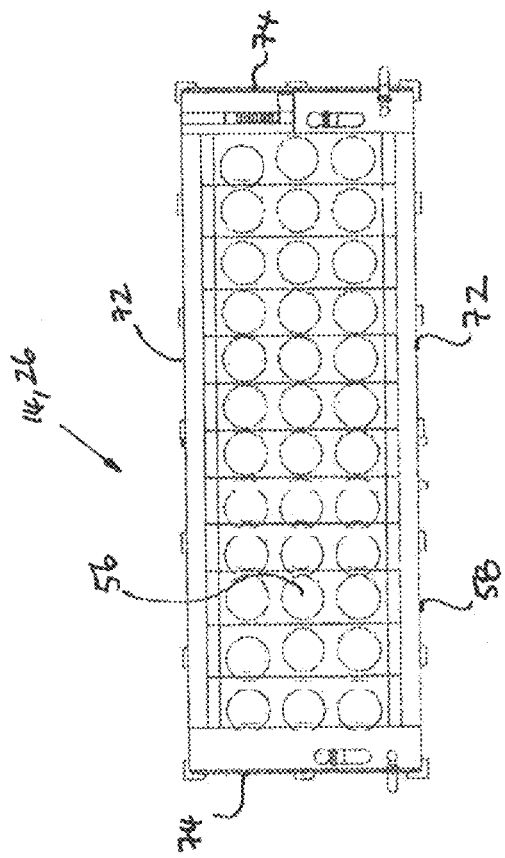
FIG. 4(b) is a plan view of the module of FIG. 4(a)
Figure 4A:
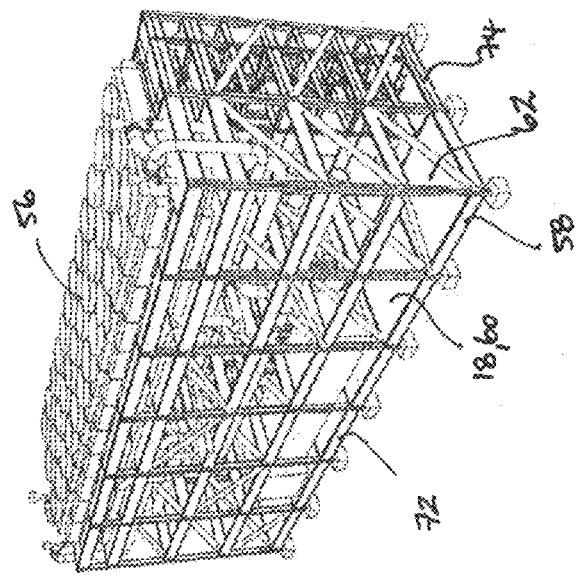
FIG. 4(a) is an isometric view from one direction of one of the plurality of modules of an LNG production train of the present invention showing a fully covered module without an uncovered section.

Referring to FIGS. 4(a) and 4(b) and FIG. 5, the process includes the step of arranging a first sub-section (56) of the second row of heat exchanger bays (36) at an elevated level (40) vertically offset from and towards a first edge (58) of the second module base (60). This arrangement is used to provide a covered section (62) of the second module base (60). When the second module (26) is installed at the production location, the first edge (58) of the second module base (60) is positioned so that the first sub-section (56) forms part of the second row of heat exchanger bays (36) of the installed production train (16).

In embodiment illustrated in FIG. 4(a), 4(b) and FIG. 5, the covered section (62) of the second module base (60) comprises at least 90% of the second module base. In an alternative embodiment illustrated in FIG. 6, the second module base (60) is designed and sized to include a covered section (62) and an uncovered section (64). The uncovered section (64) may be provided for mounting the selected piece of process equipment (50) on the second module base (60). As can be seen from FIG. 6, when the second module is installed at the production location, the first edge (58) of the second module base (60) is positioned so that the first sub-section (56) forms part of the second row of heat exchanger bays (36) of the installed production train (16) with the result that the covered section (62) of the second module base (60) is positioned closest to the longitudinal axis (22) of the installed production train (16) whilst the uncovered section (62) of the second module base (60) is positioned away from the longitudinal axis (22) of the installed production train (16).

Figures 7, 8:
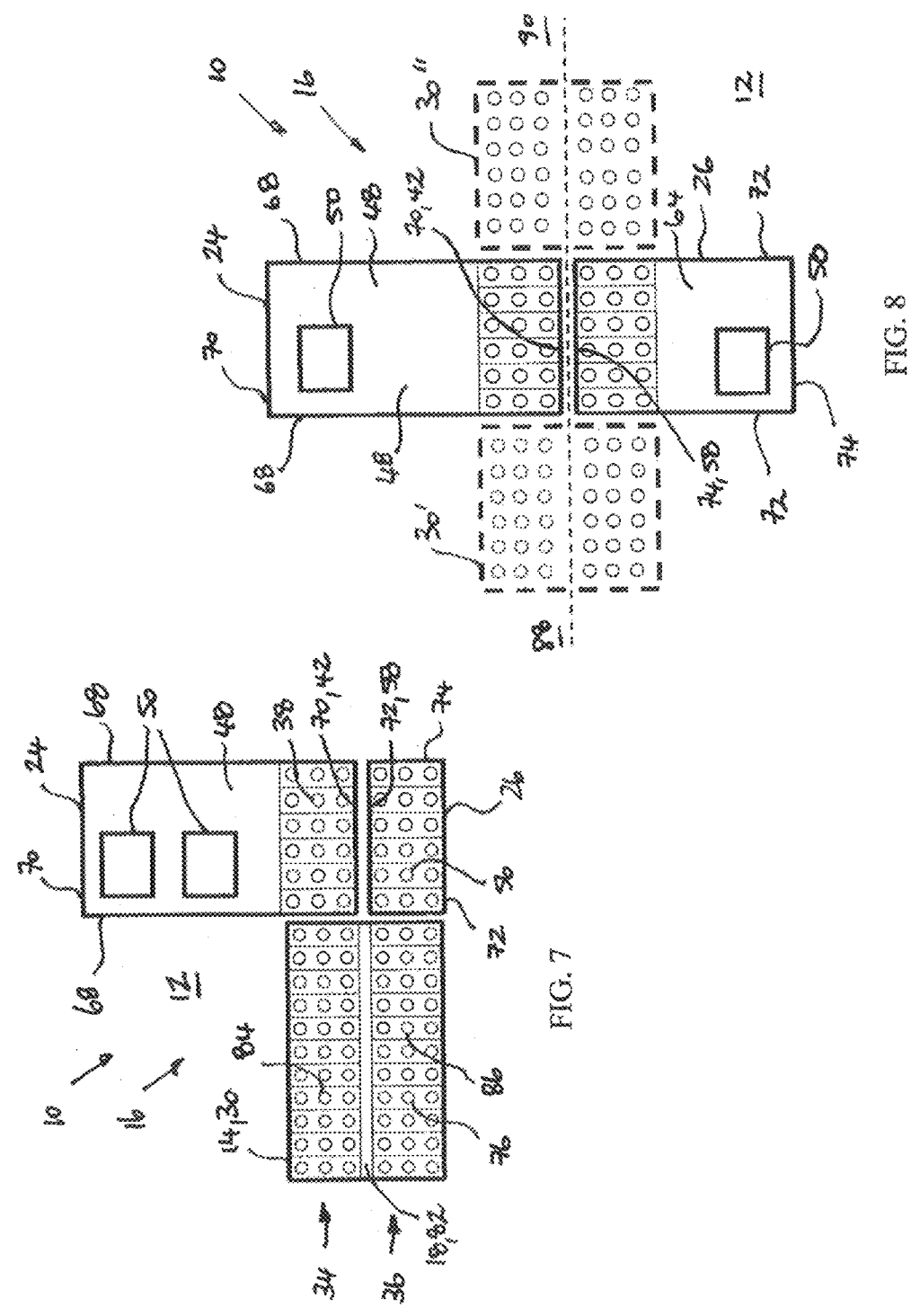

The module base (18) of each of the plurality of modules (14) may have a generally rectangular or square footprint. When the first module base (44) has a rectangular footprint comprising two long sides (68) and two short sides (70), the first edge (42) of the first module base (44) may be arranged along one of the two long sides (68) as shown in FIGS. 5 and 6 or, alternatively, may be arranged along one of the two short sides (70) of the first module base (44) as shown in FIG. 7 and FIG. 8. In an analogous manner, when the second module base (60) has a rectangular footprint comprising two long sides (72) and two short sides (74), the first edge (58) of the second module base (60) may be arranged along one of the two long sides (72) as shown in FIGS. 5 and 6 or, alternatively, may be arranged along one of the two short sides of the first module base (74) as shown in FIG. 8. In the embodiment illustrated in FIG. 7, the first edge (42) of the first module base (44) is arranged along a short side (70) whilst the first edge (58) of the second module base (60) is arranged along one of the two long sides (72). In each embodiment, the first edge (58) of the second module base (60) is positioned at the production location towards the first edge (42) of the first module base (44).

Figure 9A:
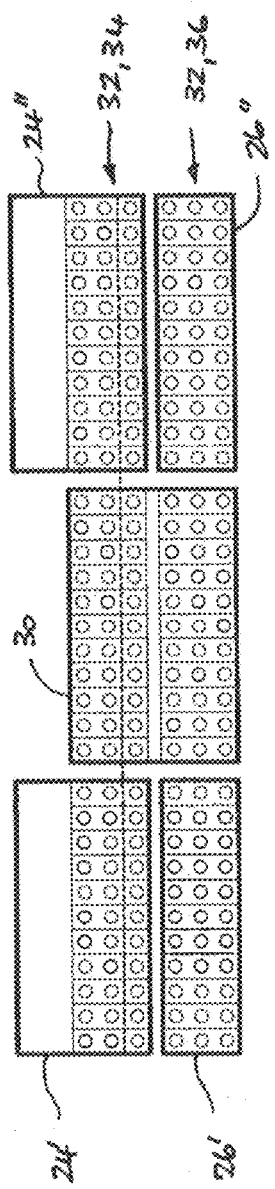
FIG. 9(a) is a schematic plan view of one embodiment of the present invention showing two first modules, each with a covered and uncovered section, two fully covered second modules and, and a third module.
Figure 9B:
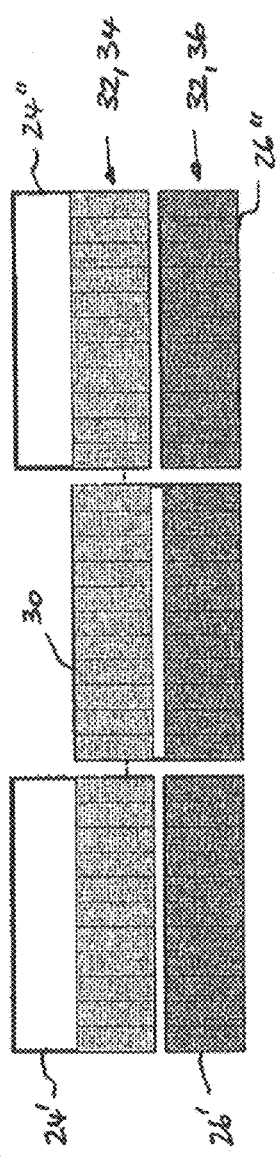
FIG. 9(b) is a schematic plan view of one embodiment of the present invention in which a first row of heat exchanger bays is shaded in light grey and in which a second row of heat exchanger bays is shaded in dark grey.
Figure 9C:
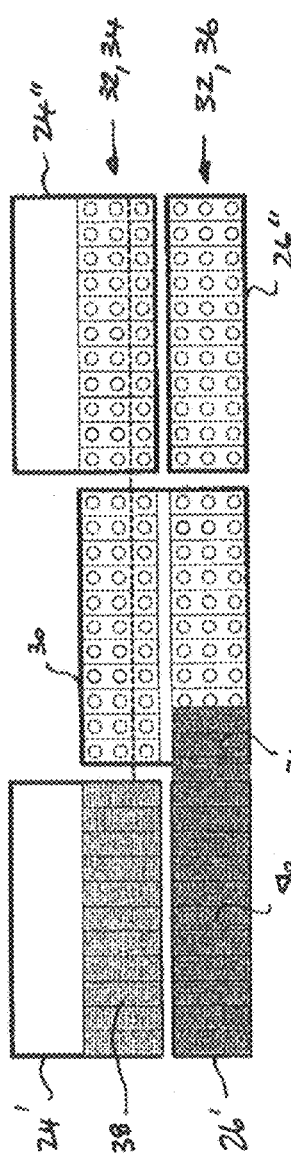
FIG. 9(c) is a schematic plan view of one embodiment of the present invention in which a first section of the first row of heat exchanger bays is shaded in light grey and in which a second plurality of heat exchangers operatively associated with the second selected function on the second module base is shaded in dark grey.

In all embodiments of the present invention, the air-cooled heat exchanger bank (36) is designed so that the first module (24) does not include any heat exchanger from the second row of heat exchanger bays (42) and the second module (26) does not include any heat exchanger from the first row of heat exchanger bays (40). To illustrate this, FIG. 9(a) shows an installed production train comprising two first modules (24' and 24"), two second modules (26' and 26") and a third module (30). FIG. 9(b) shows the installed production train of FIG. 9(a) with the entire first row of heat exchanger bays (34) shaded in light grey and the entire second row of heat exchanger bays (36) shaded in dark grey for clarity purposes. In an analogous manner, FIG. 9(c) shows only the first sub-section (38) of the first row of heat exchanger bays (34) is shaded in light grey for clarity purposes. In the event that there is insufficient space available on the second module base (60) to accommodate the heat exchangers required to perform the second selected duty, the first sub-section (56) of the second row of heat exchanger bays (36) is arranged on the second module base (60) whilst a second sub-section (76) of the second row of heat exchanger bays (36) is positioned on an adjacent third module (30). By way of example, the second module may be a propane condenser module which requires a large number of heat exchangers to be included in the second plurality of heat exchangers (56). FIG. 9(c) shows the first sub-section (56) and the second sub-section (76) of the second row of heat exchanger bays (36) shaded in dark grey for clarity purposes. It is apparent from FIGS. 9(a) and 9(b), that the first module (24') includes a first sub-section of the first row of heat exchanger bays (34) without including a first sub-section of the second row of heat exchanger bays (36).

Referring to FIG. 7, the process may include the step of arranging a plurality of third module heat exchangers (80) operatively associated with the third selected function of the third module (30) on the third module base (82). The plurality of third module heat exchangers (80) includes both a second section (84) of the first row of heat exchanger bays (34) and a second section (76) of the second row of heat exchanger bays (36). The plurality of third module heat exchangers are arranged on an elevated level (40) vertically offset from the third module base (82) to provide a covered section (86) of the third module base (82). In this embodiment, the third module base (82) is sized such that the plurality of third module heat exchangers (80) covers at least 90% of the third module base to form a fully covered third module. As best seen in FIG. 7, the third module (30) includes sections of both the first and second rows of heat exchanger bays. In the embodiment illustrated in FIG. 8, the third module is one of a plurality of third modules with two third modules (30' and 30") shown. Each of the third modules (30' and 30") includes sections of both the first and second rows of heat exchanger bays. One of the third modules (30') is arranged at a first end (88) of the installed production train (16) and the other third module (30") is arranged at a second end (90) of the installed production train (16).

The process of the present invention allows for constructing at least one of the plurality of modules at a construction location or assembling at least one of the plurality of modules at an assembly location prior to transport to the production location, and testing the at least one module for verification purposes at the construction or assembly location. Within each module, the pieces of equipment required to perform the pre-determined function assigned to that module are arranged to minimize interfaces between modules so as to minimize the hook-up that is required to be completed when the modules are delivered from a construction location or assembly location to the production location. In this way, a module can be essentially self-contained and provided with a temporary control system to allow the module to be switched on for loop checks and commissioning at the construction or assembly location prior to transport to the production location. Upon arrival at the production location, wireless control may be used for inter-modular communication and control to further reduce the hook-up time. At a production location where it is important to minimize the length of interconnecting pipe runs between modules, the plurality of modules are spaced as closely as possible, while still allowing sufficient room at the production location to hook up the interconnections between modules.

Figure 11:
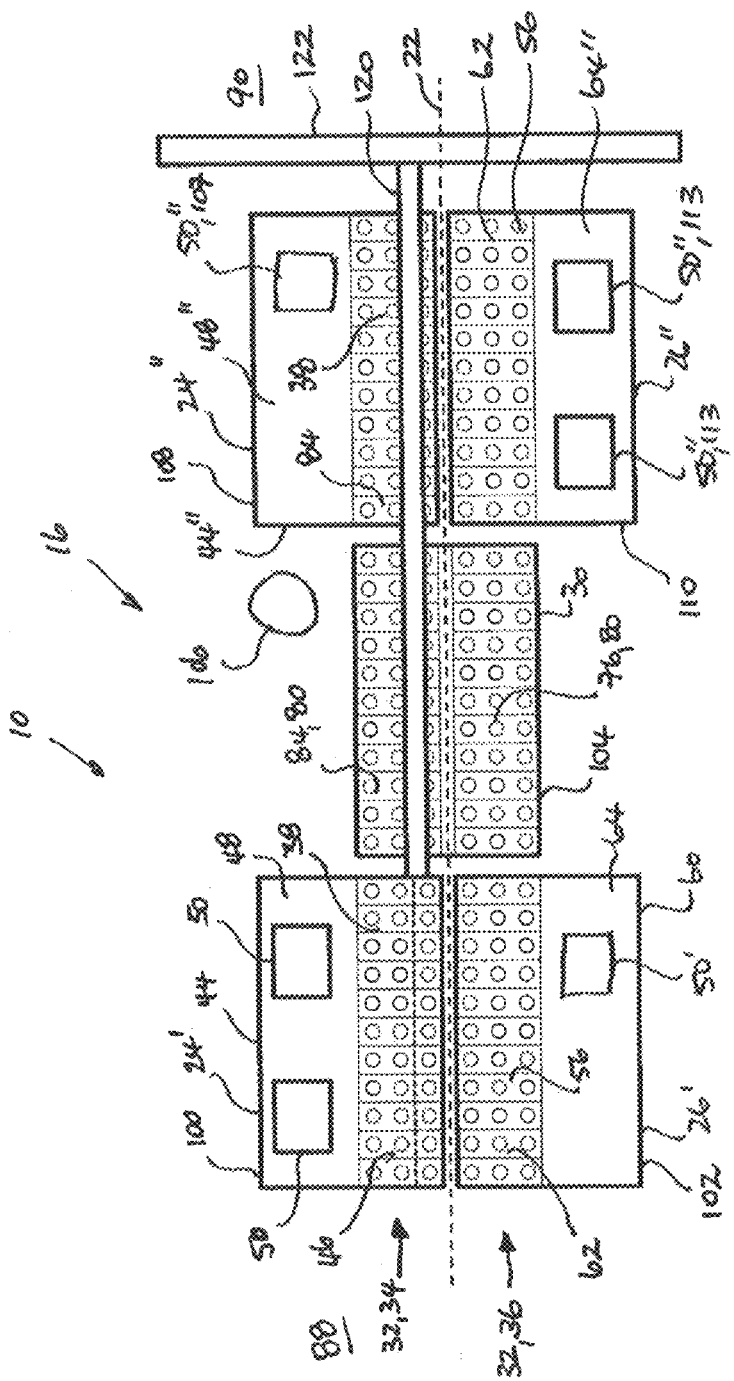
FIG. 11 is a schematic plan view of one embodiment of the present invention showing two first modules, each with a covered and uncovered section, two second modules, each with a covered and uncovered section, and, a third module.

Further alternative embodiments are illustrated in FIG. 10 to FIG. 19 for which like references refer to like parts. In each of the embodiments illustrated in FIG. 10, FIG. 11, and FIG. 12, the first module is one of a plurality of first modules with two first modules (24' and 24") being shown by way of example only. The second module is similarly one of a plurality of second modules with two second modules (26' and 26") being shown by way of example only, only with one third module (30). In FIG. 11, all of the first modules and all of the second modules include covered and uncovered sections whilst in FIG. 10, one of the plurality of second modules (26') is fully covered by a first sub-section of the second row of heat exchanger bays. FIG. 12 illustrates that the module bases of adjacent first and second modules may be offset relative to each other along the longitudinal axis of the installed production train.

Whilst it is preferable for one or both of the first row of heat exchanger bays or the second row of heat exchanger bays to be arranged in a straight line as illustrated in FIGS. 5 to 12, this is not essential. In the embodiment illustrated in FIG. 13, the first row of heat exchanger bays (34) which is designated by an arrow labelled with reference numeral (35) is non-linear and the second row of heat exchanger bays (36) is comprised entirely of the first sub-section (56) of the second row of heat exchanger bays (36). In other words, all of the second row of heat exchanger bays (34) is provided on the second module base (60). In the embodiment illustrated in FIG. 14, the first sub-section (38) of the first row of heat exchanger bays (34) is the first row of heat exchanger bays (34). In other words, all of the first row of heat exchanger bays (34) is provided on the first module base (44).

In the embodiments illustrated in FIG. 15 and FIG. 16, the installed production train (16) includes one first module (24), one second module (26), one third module (30), a fourth module (92) and a fifth module (94). Each of the third, fourth and fifth modules are designed to include a sub-section of the first row of heat exchanger bays (34) and a sub-section of the second row of heat exchanger bays (36). In the embodiment illustrated in FIG. 15, both the fourth module and the fifth module include a covered section (96) and an uncovered section (98). Each uncovered section (98) is provided for mounting of one or more selected pieces of equipment (50) in an analogous manner to that described above. In the embodiment illustrated in FIG. 16, both the fourth module and the fifth module include a covered section (96) and two uncovered sections (98' and 98"). Each uncovered section (98) is provided for mounting of one or more selected pieces of equipment (50) in an analogous manner to that described above.

Figure 17:
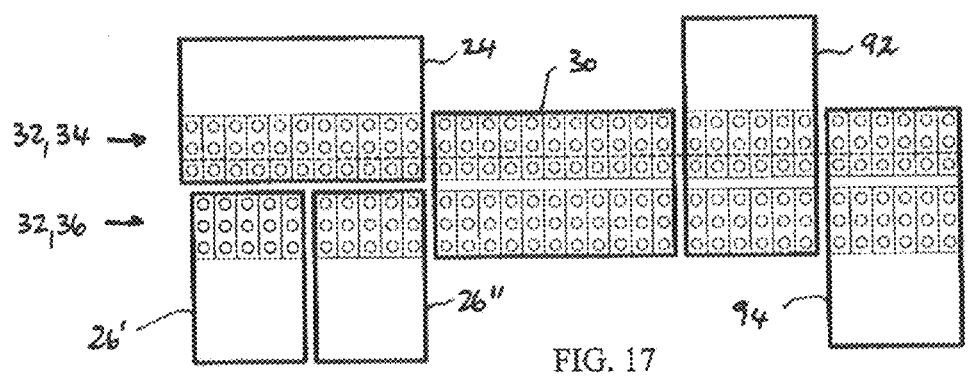
FIG. 17 is a schematic plan view of one embodiment of the present invention showing one first module, two second modules, one third module, one fourth module and one fifth module.
Figure 18:
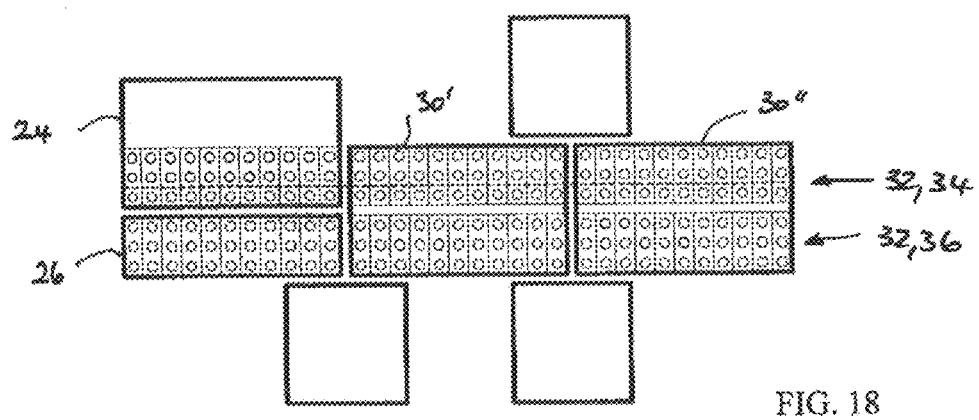
FIG. 18 is a schematic plan view of one embodiment of the present invention showing one first module with a covered and uncovered section, one fully covered second module, and two fully covered third modules.
Figure 19:
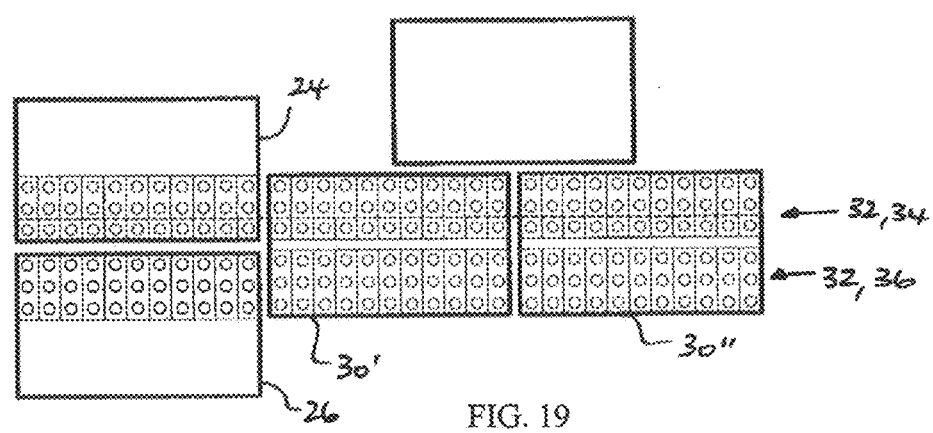
FIG. 19 is a schematic plan view of one embodiment of the present invention showing one first module with a covered and uncovered section, one second module with a covered and uncovered section, and two fully covered third modules.

The embodiment illustrated in FIG. 17 shows one first module (24), two second modules (26' and 26"), one third module (30), one fourth module (92) and one fifth module (94). The embodiment illustrated in FIG. 18 shows one first module (24) with a covered and uncovered section, one fully covered second module (26), and two fully covered third modules (30' and 30"). The embodiment illustrated in FIG. 19 shows one first module (24) with a covered and uncovered section, one second module (26) with a covered and uncovered section, and two fully covered third modules (30' and 30"). As with all other embodiments, the first module (24) includes a first sub-section of the first row of heat exchanger bays (34) without including a first sub-section of the second row of heat exchanger bays (36) and the second module (26) includes a first sub-section of the second row of heat exchanger bays (36) without including a section of the first row of heat exchanger bays (36).

In the embodiments illustrated in FIG. 20, the first sub-section (38) of the first row of heat exchanger bays (34) is arranged to extend outwardly beyond the first edge (42) of the first module base (44). Using this arrangement, when the first edge (42) of the first module base (44) is positioned towards the first a first edge (58) of the second module base (60) to form the installed production train (16), the first sub-section (38) of the first row of heat exchanger bays (34) is adjacent to the first sub-section (56) of the second row of heat exchanger bays (36), whilst leaving a gap (97) between the first module base (44) and the second module base (60). In the embodiment illustrated in FIG. 21, the first sub-section (56) of the second row of heat exchanger bays (36) is arranged to extend outwardly beyond the first edge (58) of the second module base (60) to form the gap (97). In the embodiment illustrated in FIG. 22, the first sub-section (38) of the first row of heat exchanger bays (34) is arranged to extend outwardly beyond the first edge (42) of the first module base (44), and, the first sub-section (56) of the second row of heat exchanger bays (36) is arranged to extend outwardly beyond the first edge (58) of the second module base (60) to form the gap (97). Advantageously, the gap (97) provides room for underground services (99), for example, electrical cables, to come up within the installed production train (16) without having a module positioned over them.

One embodiment of the use of the production train (16) for the production of LNG is now described with reference to FIG. 11, by way of example only. In general terms, a process for liquefying a natural gas stream comprises the steps of:
  i) pre-treating a natural gas feed stream in a pre-treatment module (100) to produce a pre-treated natural gas stream;
  ii) pre-cooling the pre-treated natural gas stream in a first refrigerant compression module (102) to produce a pre-cooled gas stream and a first refrigerant vapour stream which is compressed therein;
  iii) condensing the first refrigerant vapour stream in a first refrigerant condenser module (104) to produce a compressed first refrigerant stream for recycle to step ii);

iv) further cooling the pre-cooled gas stream in a main cryogenic heat exchanger (106) operatively associated with a liquefaction module (108) through indirect heat exchange with a second refrigerant to produce a liquefied natural gas product stream and a second refrigerant vapour stream; and, v) compressing the second refrigerant vapour stream in a second refrigerant compression module (110) to produce a compressed second refrigerant stream for recycle to step iv).

Referring to FIG. 11, the production train (16) comprises the following modules:

a) a pretreatment module (100);

b) a first refrigerant compression module (102), in this example, a propane compression module;

c) a first refrigerant condenser module (104), in this example, a propane condenser module;

d) a liquefaction module (108); and, e) a second refrigerant compression module (110), in this example, a mixed refrigerant (MR) compression module.

For comparison purposes only, the equivalent modules of a production train of the prior art are marked up in FIG. 2(a) with reference numerals 100, 102, 104, 108 and 110.

In embodiment of the present invention now described with reference to FIG. 11, the first refrigerant is propane while the second refrigerant is a mixed refrigerant hydrocarbon mixture, by way of example only. This type of process is known as the propane pre-cooled mixed refrigerant, or C3MR process, which is used to manufacture most of the LNG produced worldwide and is a process that is not further discussed here is it considered to be well known to the person skilled in the art. When using propane as the first refrigerant, care is taken to ensure that propane does not leak because propane vapour is highly flammable. Using the process of the present invention, the process equipment required for propane compression is grouped together within a propane compression module to facilitate the pre-commissioning and commissioning of that module—having all of the accessories that are needed to circulate fluid through the compressor at the construction or assembly location. To further improve safely, the main rotating equipment associated with the propane compression circuit is placed on an uncovered section of one of the plurality of modules rather than underneath the plurality of heat exchangers arranged on the elevated level.

In the embodiment illustrated in FIG. 11, the pretreatment module (100) is a first module (24'), the first refrigerant compression module (102) is a second module (26'), and the first refrigerant condenser module (104) is a third module (30). In addition to this the liquefaction module (108) is a first module (24") and the second refrigerant compression module (110) is a second module (26"). In terms of construction scheduling, the compressors are long lead items. This embodiment allows for the installation of the pretreatment module (100) and first refrigerant condenser module (104) to occur at the production location (12) without needing to wait for the installation of the first refrigerant compression module (102). In an analogous manner, the liquefaction module (108) can be installed at the production location (12) without the need to wait for the installation of the second refrigerant compression module (110).

This arrangement allows for direct fluid communication between the first refrigerant compression module (102) and the first refrigerant condenser module (104) without the need for the first refrigerant to be piped across the pretreatment module (100). This arrangement further allows for direct fluid communication between the second refrigerant compression module (110) and the first refrigerant condenser module (104). Thus in order for the second refrigerant to be cooled by the first refrigerant in heat exchangers either inside or adjacent to the first refrigerant compression module (102), it only has to pass through one intermediate module, the first refrigerant condenser module (104), rather than both the first refrigerant condenser module (104) and the liquefaction module (108). This is an advantage of the present invention compared to the prior art illustrated in FIG. 2(a). This arrangement further allows for direct fluid communication between the liquefaction module (108) and the end of the LNG trains, from which the LNG will be piped to the LNG storage tank. Thus the LNG product stream does not need to pass through the second refrigerant compression module (110). This is an advantage of the present invention compared to the prior art illustrated in FIG. 2(a).

The arrangement illustrated in FIG. 11 allows a section of selected pipework (120) that runs along the length of the installed production train (16) to be completed with fewer hook-ups at the production location (12). For example, raw feed gas must be piped to the gas pretreatment module (100) which is positioned towards the first end (88) of the production train (16). If the interconnections with the main plant piperack (122) occur at the second opposite end (90) of the installed production train (16), the raw feed gas pipework (120) will need to traverse through only two unrelated modules (108 and 104). In contrast, using the prior art arrangement illustrated in FIG. 2(a), the same service would have to pass through four unrelated modules (110, 108, 104 and 102). In addition to the direct site labour savings, reducing the need for unrelated pipes to pass through modules assists to reduce the duration of the design process. The layout of the plurality of modules can be advanced and completed without having to wait for additional details about unrelated services.

In the embodiment illustrated in FIG. 11, the pre-treatment module is one of two first modules (24') and the first module base (44) is sized to include a covered section (46) for mounting of the first sub-section (38) of the first row of heat exchanger bays (34) and an uncovered section (48) for mounting one or more selected pieces of process equipment (50), such as an acid gas removal unit column and its associated knock-out vessel and pumps, and/or one or more molecular sieve dehydration vessels.

In the embodiment illustrated in FIG. 11, the first refrigerant compression module (102) is one of two second modules (26'). The second module base (60) is sized to include a covered section (62) for mounting of first sub-section (56) of the second row of heat exchanger bays (36) and an uncovered section (64) for mounting a selected piece of process equipment (50'), such one or more first refrigerant compressors.

In the embodiment illustrated in FIG. 11, the first refrigerant condenser module (104) is a third module (30) because this module requires a comparatively large number of heat exchangers to be included in the plurality of third module heat exchangers (80) compared with the other modules. In these embodiments, the first refrigerant condenser module (104) is aligned with the longitudinal axis (22) of the installed production train (16) to accommodate its requirement to include a second sub-section (84) of the first row of heat exchanger bays (34) and a second sub-section (76) of the second row of heat exchanger bays (36). The first refrigerant condenser module (104) may include services that contain non-flammable inventories, such as steam for heating purposes or water for either heating or cooling purposes within the installed production train. The plurality of plant equipment required for these services may be mounted underneath the first refrigerant condenser without significant safety risks due to potential leakage.

In the embodiment illustrated in FIG. 11, the liquefaction module (108) is one of two first modules (24"). The process may include the step of locating the main cryogenic heat exchanger (106) off-module adjacent to the liquefaction module (108) due to its size and weight, delivery schedule, and/or to mitigate the potential for damage during transport. Alternatively, the main cryogenic heat exchanger (106) may be positioned on the uncovered section (48") of the first module base (44"). Static equipment and pumps which are operatively associated with the main cryogenic heat exchanger are positioned on the liquefaction module (108) on the same side of the heat exchanger bank as the main cryogenic heat exchanger to minimise interconnecting piping runs. Equipment (50") associated with end-flash gas compression, nitrogen and helium removal may also be positioned on the uncovered section (48") of the liquefaction module (108) if required. An end-flash gas compression system (107) requires only very few heat exchangers with the result that the liquefaction module (104) has space available for additional heat exchangers which are operatively associated with another system.

A selected function that may require additional space is the first refrigerant condenser, which makes positioning the liquefaction module (108) in direct contact with the first refrigerant condenser module (104) advantageous. If required, the second sub-section (84) of the first row of heat exchanger bays (34) which includes heat exchangers that are operatively associated with the first refrigerant condenser module (104) may span across to partially cover the module base (44") of the adjacent liquefaction module (108).

The second compression module (110) is one of the two second modules (26"). The second compression module includes all of the process equipment required to perform the functional requirement of this module including the gas turbine, the compressor, interconnecting pipework, waste heat recovery, and recycle valves which are arranged on the module base. The plurality of heat exchangers operatively associated with the second compression module provides the required aftercooling and intercooling for the second refrigerant compressors. In this embodiment, the second compression module (110) includes an uncovered section (64") of sufficient size to accommodate one or more refrigerant compressors (113).

Each module has been designed to ensure that the main hydrocarbon inventories and all rotating equipment are positioned on the uncovered sections of the modules and not underneath the elevated heat exchanger bank. This permits good access for maintenance and allows the long lead items to be incorporated into the modules late in the construction sequence. The significantly reduced hydrocarbon inventory provides improved safety by way of making it easier to deal with the consequence of a leak. In addition to this, the overall layout of the production train of the present invention is designed to for modularisation, with small compact equipment selected to suit modularisation rather than adopting the prior art approach of relying on economy of scale. Instead, smaller, more intensive equipment has been selected in order to be able to fit more items inside modules of a limited size and weight. One example of selecting smaller, more intensive equipment that is easier to modularise is the main refrigerant gas turbines. The starting point for this work was to utilise smaller more efficient aero-derivative gas turbines that can be completely integrated into modules of a practical size. Aero-derivative gas turbines have been integrated into the modules, complete with the all of the elements of each compression system. This permits the complicated, large-diameter compressor suction and discharge lines to be built at a construction location rather than having to be stick-built at the production location, whilst retaining a practical total module size/weight. Using smaller units and keeping the gas turbine and compressor integrated in the same module minimises the number of connections at site, and it also makes it possible for the compression system to be fully tested up to a nitrogen test run stage at the construction or assembly location. This extra level of commissioning and testing at the construction or assembly location is beneficial in reducing the amount of carry-over work that has to be done at a significantly higher labour rate at the production site. The variable speed nature of the aero-derivative gas turbines simplifies the compressor start-up and eliminates the need to depressurise refrigerant. Removing the need for starter/helper motors for gas turbines used in prior art LNG trains also significantly reduces the maximum electrical power demand of the modularized LNG train and helps to keep the module size down.

The production location can be onshore, offshore on a floating facility, offshore on a fixed facility, or a barge-mounted or grounded facility, provided only that the heat exchanger bank is an air-cooled heat exchanger bank. By way of example, the modules may be floated-in using steel or concrete gravity based structures with integrated LNG storage, loading and boil-off gas re-liquefaction functionality with gas supplied to the production location via a subsea pipeline. The LNG plant may further include optional treatment steps such as product purification steps (helium removal, nitrogen removal) and non-methane product production steps (de-ethanizing, de-propanizing, sulphur recovery) if desired. The natural gas feed stream may be produced at and obtained from a natural gas or petroleum reservoir. As an alternative, the natural gas feed stream may also be obtained from another source, also including a synthetic source such as a Fischer-Tropsch process wherein methane is produced from synthesis gas.

It will be clearly understood that, although a number of prior art publications are referred to herein, this reference does not constitute an admission that any of these documents forms part of the common general knowledge in the art, in Australia or in any other country. In the summary of the invention, the description and claims which follow, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

What is claimed:

1. A liquefied natural gas production process for producing a product stream of liquefied natural gas at a production location, said process comprising:
   a) designing a plurality of modules for installation at the production location to form an installed production train, each module having a module base for mounting a plurality of plant equipment associated with a selected function associated with the production of liquefied natural gas, said selected function being assigned to said module, the plurality of modules including a first module assigned to perform a first selected function, and, a second module assigned to perform a second selected function;

(b) designing an air-cooled heat exchanger bank for the installed production train, the heat exchanger bank including: a first row of air-cooled heat exchanger bays, and, an adjacent parallel second row of air-cooled heat exchanger bays;

(c) arranging a first sub-section of the first row of heat exchanger bays at an elevated level vertically offset from and towards a first edge of a first module base to form a covered section of the first module base, the first module base being designed and sized to include an uncovered section for mounting a selected piece of process equipment, wherein the first module includes the first sub-section of the first row of heat exchanger bays without including a sub-section of the second row of heat exchanger bays;

(d) arranging a first sub-section of the second row of heat exchanger bays at an elevated level vertically offset from and towards a first edge of a second module base to provide a covered section of the second module base, wherein the second module includes the first sub-section of the second row of heat exchanger bays without including a sub-section of the first row of heat exchanger bays; and (e) positioning the first edge of the second module base at the production location towards the first edge of the first module base.

2. The process of claim 1 wherein the selected piece of equipment is: a rotating piece of equipment associated with a circulating refrigerant, a piece of equipment having a flammable inventory, a long lead-time piece of equipment, or a piece of equipment having an overall height that is taller than the height of the elevated level.

3. The process of claim 1 further comprising the step of sizing the second module base to include an uncovered section for mounting a selected piece of process equipment.

4. The process of claim 3 wherein the selected piece of equipment is: a rotating piece of equipment associated with a circulating refrigerant, a piece of equipment having a flammable inventory, a long lead-time piece of equipment, or, a piece of equipment having an overall height that is taller than the height of the elevated level.

5. The process of claim 1 wherein the first module base has a rectangular footprint comprising two long sides and two short sides and the first edge of the first module base is arranged along one of the two long sides.

6. The process of claim 1 wherein the second module base has a rectangular footprint comprising two long sides and two short sides and the first edge of the second module base is arranged along one of the two long sides.

7. The process of claim 1 wherein the first module base has a rectangular footprint comprising two long sides and two short sides and the first edge of the first module base is arranged along one of the two short sides.

8. The process of claim 1 wherein the second module base has a rectangular footprint comprising two long sides and two short sides and the first edge of the second module base is arranged along one of the two short sides.

9. The process of claim 1 wherein a second sub-section of the first or second row of heat exchanger bays is positioned on an adjacent module.

10. The process of claim 1 wherein the first module is one of a plurality of first modules.

11. The process of claim 1 wherein the second module is one of a plurality of second modules.

12. The process of claim 1 further comprising the step of constructing at least one of the plurality of modules at a construction location or assembling at least one of the plurality of modules at an assembly location prior to transport to the production location, and testing the at least one module for verification purposes at the construction or assembly location.

13. The process of claim 1 wherein the installed production train has a longitudinal axis extending from a first end of the installed production train to a second end of the installed production train and the first row of heat exchanger bays is arranged in a straight line parallel or perpendicular to the longitudinal axis of the installed production train.

14. The process of claim 1 wherein the installed production train has a longitudinal axis extending from a first end of the installed production train to a second end of the installed production train and the second row of heat exchanger bays is arranged in a straight line parallel or perpendicular to the longitudinal axis of the installed production train.

15. The process of claim 1 wherein the first sub-section of the first row of heat exchanger bays is the first row of heat exchanger bays.

16. The process of claim 1 wherein the first sub-section of the second row of heat exchanger bays is the second row of heat exchanger bays.

17. The process of claim 1 wherein the first sub-section of the first row of heat exchanger bays is arranged to extend outwardly beyond the first edge of the first module base, and a gap is formed between the first module base and the second module base during step (d).

18. The process of claim 1 wherein the first sub-section of the second row of heat exchanger bays is arranged to extend outwardly beyond the first edge of the second module base, and a gap is formed between the first module base and the second module base during step (d).

19. The process of claim 1 wherein the first sub-section of the first row of heat exchanger bays and the first sub-section of the second row of heat exchanger bays is arranged to extend outwardly beyond the first edge of the second module base, and a gap is formed between the first module base and the second module base during step (d).

20. The process of claim 1 further comprising the steps of arranging a plurality of third module heat exchangers operatively associated with a third selected function on a third module base to form a portion of the first row of heat exchanger bays and a portion of the second row of heat exchanger bays, the plurality of third module heat exchangers being arranged on an elevated level vertically offset from the third module base to provide a covered section of the third module base.

21. The process of claim 20 further comprising the steps of sizing the third module base such that the plurality of third module heat exchangers covers at least 90% of the third module base to form a fully covered third module.

22. The process of claim 20 wherein the third module is one of a plurality of third modules.

23. The process of claim 1 wherein one of the plurality of modules is a pre-treatment module for removing contaminants from a natural gas feed stream to produce a pre-treated natural gas stream.

24. The process of claim 1 wherein one of the plurality of modules is a first refrigerant condenser module for pre-cooling a pre-treated natural gas stream to produce a pre-cooled gas stream and a first refrigerant vapour stream.

25. The process of claim 1 wherein one of the plurality of modules is a first refrigerant compression module for compressing a first refrigerant vapour stream to produce a compressed first refrigerant stream for recycle to a first refrigerant condenser module.

26. The process of claim 1 wherein one of the plurality of modules is a liquefaction module operatively associated with a main cryogenic heat exchanger for further cooling a pre-cooled gas stream through indirect heat exchange with a second refrigerant to produce a liquefied natural gas product stream and a second refrigerant vapour stream.

27. The process of claim 1 wherein one of the plurality of modules is a second refrigerant compression module for compressing a second refrigerant vapour stream to produce a compressed second refrigerant stream for recycle to a main cryogenic heat exchanger.

28. The process of claim 1 wherein the first refrigerant is propane or nitrogen.

29. The process of claim 1 wherein the second refrigerant is a mixed refrigerant hydrocarbon mixture or nitrogen.

30. The process of claim 1 wherein the production location is onshore, offshore on a floating facility, offshore on a fixed facility, barge-mounted or grounded facility.

31. A liquefied natural gas production plant for producing a product stream of liquefied natural gas installed at a production location comprising:
  a plurality of modules designed for installation at the production location to form an installed production train, each module having a module base for mounting a plurality of plant equipment associated with a selected function associated with the production of liquefied natural gas, said selected function being assigned to said module, the plurality of modules including a first module assigned to perform a first selected function, and a second module assigned to perform a second selected function;
  an air-cooled heat exchanger bank designed for the installed production train, the heat exchanger bank including: a first row of air-cooled heat exchanger bays, and, an adjacent parallel second row of air-cooled heat exchanger bays;
  a first sub-section of the first row of heat exchanger bays arranged at an elevated level vertically offset from and towards a first edge of a first module base to form a covered section of the first module base, the first module base being designed and sized to include an uncovered section for mounting a selected piece of process equipment, wherein the first module includes the first sub-section of the first row of heat exchanger bays without including a sub-section of the second row of heat exchanger bays;
  a first sub-section of the second row of heat exchanger bays arranged at an elevated level vertically offset from and towards a first edge of a second module base to provide a covered section of the second module base, wherein the second module includes the first sub-section of the second row of heat exchanger bays without including a sub-section of the first row of heat exchanger bays; and
  the first edge of the second module base positioned at the production location towards the first edge of the first module base.

32. The production plant of claim 31 wherein the selected piece of equipment is: a rotating piece of equipment associated with a circulating refrigerant, a piece of equipment having a flammable inventory, a long lead-time piece of equipment, or a piece of equipment having an overall height that is taller than the height of the elevated level.

33. The production plant of claim 31 wherein the second module base is sized to include an uncovered section for mounting a selected piece of process equipment.

34. The production plant of claim 31 wherein the selected piece of equipment is: a rotating piece of equipment associated with a circulating refrigerant, a piece of equipment having a flammable inventory, a long lead-time piece of equipment, or a piece of equipment having an overall height that is taller than the height of the elevated level.

35. The production plant of claim 31 wherein the first module base has a rectangular footprint comprising two long sides and two short sides and the first edge of the first module base is arranged along one of the two long sides.

36. The production plant of claim 31 wherein the second module base has a rectangular footprint comprising two long sides and two short sides and the first edge of the second module base is arranged along one of the two long sides.

37. The production plant of claim 31 wherein the first module base has a rectangular footprint comprising two long sides and two short sides and the first edge of the first module base is arranged along one of the two short sides.

38. The production plant of claim 31 wherein the second module base has a rectangular footprint comprising two long sides and two short sides and the first edge of the second module base is arranged along one of the two short sides.

39. The production plant of claim 31 wherein a second sub-section of the first or second row of heat exchanger bays is positioned on an adjacent module.

40. The production plant of claim 31 wherein the first module is one of a plurality of first modules.

41. The production plant of claim 31 wherein the second module is one of a plurality of second modules.

42. The production plant of claim 31 wherein the installed production train has a longitudinal axis extending from a first end of the installed production train to a second end of the installed production train and the first row of heat exchanger bays is arranged in a straight line parallel or perpendicular to the longitudinal axis of the installed production train.

43. The production plant of claim 31 wherein the installed production train has a longitudinal axis extending from a first end of the installed production train to a second end of the installed production train and the second row of heat exchanger bays is arranged in a straight line parallel or perpendicular to the longitudinal axis of the installed production train.

44. The production plant of claim 31 wherein the first sub-section of the first row of heat exchanger bays is the first row of heat exchanger bays.

45. The production plant of claim 31 wherein the first sub-section of the second row of heat exchanger bays is the second row of heat exchanger bays.

46. The production plant of claim 31 wherein the first sub-section of the first row of heat exchanger bays is arranged to extend outwardly beyond the first edge of the first module base, and a gap is formed between the first module base and the second module.

47. The production plant of claim 31 wherein the first sub-section of the second row of heat exchanger bays is arranged to extend outwardly beyond the first edge of the second module base, and a gap is formed between the first module base and the second module base.

48. The production plant of claim 31 wherein the first sub-section of the first row of heat exchanger bays and the first sub-section of the second row of heat exchanger bays is arranged to extend outwardly beyond the first edge of the second module base, and a gap is formed between the first module base and the second module base during step (d).

49. The production plant of claim 31 further comprising a plurality of third module heat exchangers operatively associated with a third selected function arranged on a third module base to form a portion of the first row of heat exchanger bays and a portion of the second row of heat exchanger bays, the plurality of third module heat exchangers being arranged on an elevated level vertically offset from the third module base to provide a covered section of the third module base.

50. The production plant of claim 49 wherein the third module base is sized such that the plurality of third module heat exchangers covers at least 90% of the third module base to form a fully covered third module.

51. The production plant of claim 49 wherein the third module is one of a plurality of third modules.

52. The production plant of claim 31 wherein one of the plurality of modules is a pre-treatment module for removing contaminants from a natural gas feed stream to produce a pre-treated natural gas stream.

53. The production plant of claim 31 wherein one of the plurality of modules is a first refrigerant condenser module for pre-cooling a pre-treated natural gas stream to produce a pre-cooled gas stream and a first refrigerant vapour stream.

54. The production plant of claim 31 wherein one of the plurality of modules is a first refrigerant compression module for compressing a first refrigerant vapour stream to produce a compressed first refrigerant stream for recycle to a first refrigerant condenser module.

55. The production plant of claim 31 wherein one of the plurality of modules is a liquefaction module operatively associated with a main cryogenic heat exchanger for further cooling a pre-cooled gas stream through indirect heat exchange with a second refrigerant to produce a liquefied natural gas product stream and a second refrigerant vapour stream.

56. The production plant of claim 31 wherein one of the plurality of modules is a second refrigerant compression module for compressing a second refrigerant vapour stream to produce a compressed second refrigerant stream for recycle to a main cryogenic heat exchanger.

57. The production plant of claim 31 wherein the first refrigerant is propane or nitrogen.

58. The production plant of claim 31 wherein the second refrigerant is a mixed refrigerant hydrocarbon mixture or nitrogen.

59. The production plant of claim 31 wherein the production location is onshore, offshore on a floating facility, offshore on a fixed facility, barge-mounted or grounded facility.

* * * * *